(12) United States Patent
Watabe

(10) Patent No.: US 8,855,820 B2
(45) Date of Patent: Oct. 7, 2014

(54) LEG MOTION TRAJECTORY GENERATION DEVICE FOR LEGGED MOBILE ROBOT

(71) Applicant: Honda Motor Co., Ltd., Tokyo (JP)

(72) Inventor: Tomoki Watabe, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 120 days.

(21) Appl. No.: 13/737,344

(22) Filed: Jan. 9, 2013

(65) Prior Publication Data

US 2013/0178983 A1 Jul. 11, 2013

(30) Foreign Application Priority Data

Jan. 10, 2012 (JP) ................................ 2012-002322

(51) Int. Cl.
*G05D 3/12* (2006.01)
*B62D 57/032* (2006.01)
*G05D 1/02* (2006.01)

(52) U.S. Cl.
CPC ................ *G05D 3/12* (2013.01); *B62D 57/032* (2013.01); *Y10S 901/01* (2013.01); *G05D 1/0251* (2013.01); *G05D 2201/0217* (2013.01)
USPC .............................................. 700/253; 901/1

(58) Field of Classification Search
CPC ................ Y10S 901/01; G06N 3/008; G05D 2201/0217; B62D 57/032; B62D 57/02; B62D 57/024; F16F 9/06; A63H 11/00; H02K 41/00
USPC ................. 700/250, 253, 254, 260, 261; 318/568.12; 901/1, 9
See application file for complete search history.

(56) References Cited

U.S. PATENT DOCUMENTS

| 7,379,789 | B2 * | 5/2008 | Takenaka et al. ............. 700/245 |
| 7,860,611 | B2 * | 12/2010 | Takenaka et al. ............. 700/245 |
| 8,005,573 | B2 * | 8/2011 | Takenaka et al. ............. 700/260 |
| 2006/0184276 | A1 * | 8/2006 | Takenaka et al. ............. 700/245 |
| 2010/0042256 | A1 * | 2/2010 | Takenaka et al. ............. 700/245 |

FOREIGN PATENT DOCUMENTS

JP 2010-253655 11/2010

* cited by examiner

*Primary Examiner* — Jason Holloway
(74) *Attorney, Agent, or Firm* — Rankin, Hill & Clark LLP

(57) ABSTRACT

A device 11 includes a floor surface information acquisition portion 21 which acquires floor surface information in a plurality of local regions of a floor surface. The gait generator 22 of the device 11 sets the desired landing position and posture of a free leg 3 of a robot 1 within one local region and determines a desired horizontal motion trajectory of the distal end of the free leg 3 to determine a desired vertical motion trajectory of the distal end of the free leg 3 so that the height of the distal end of the free leg 3 is equal to or higher than a lower-limit height determined to prevent a contact between the distal end of the free leg 3 and the floor surface of the local region at the positions of a plurality of sampling points on the desired horizontal motion trajectory.

9 Claims, 16 Drawing Sheets

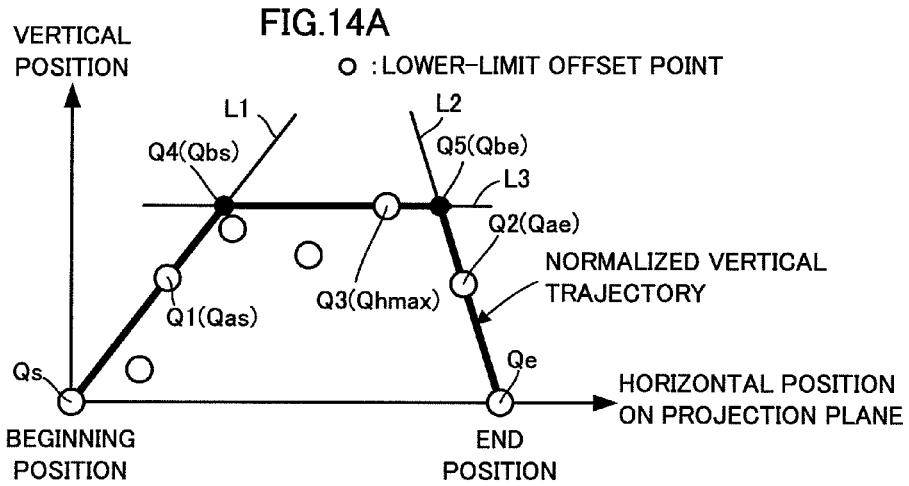
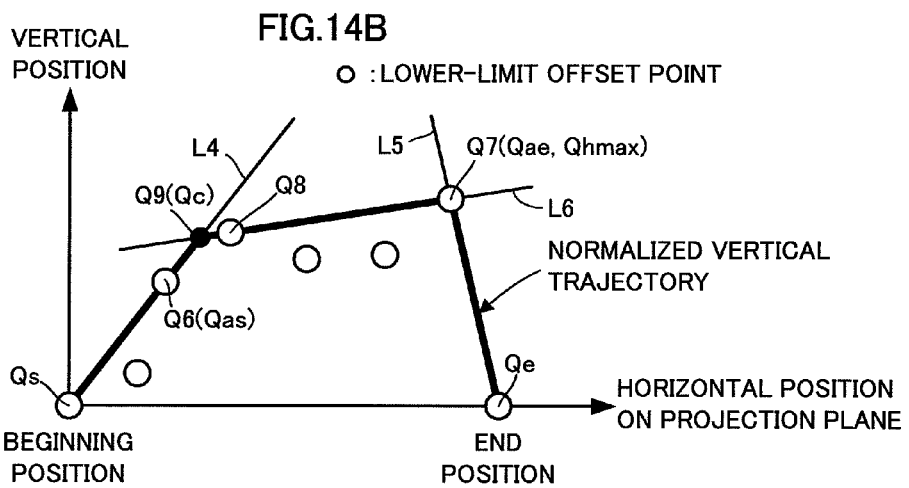
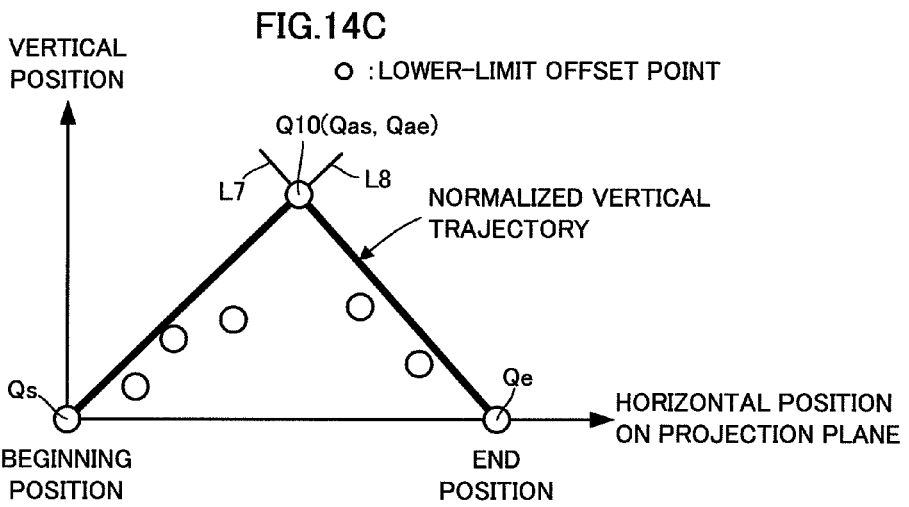

LEG MOTION TRAJECTORY GENERATION DEVICE FOR LEGGED MOBILE ROBOT

BACKGROUND OF THE INVENTION

1. Field of the Invention

The present invention relates to a device which generates a desired motion trajectory of legs of a legged mobile robot such as a biped locomotion robot.

2. Description of the Related Art

A legged mobile robot (hereinafter, simply referred to as "robot" in some cases) moves by repeating a leaving motion and a landing motion of each leg. Therefore, when moving the legged mobile robot, it is necessary to determine a desired position (desired landing position) on a floor surface where each leg is landed on the floor by the landing motion of the leg subsequent to the leaving motion thereof and a desired motion trajectory which defines the movement in the air.

As a method of generating the desired motion trajectory of each leg in this manner, for example, as disclosed in Japanese Patent Application Laid-Open No. 2010-253655 (hereinafter, referred to as Patent Document 1), there is known a method of preparing a plurality of candidates for a desired motion trajectory of each leg, measuring the configuration of a floor ahead in the moving direction of the robot, and selecting and determining a desired motion trajectory able to avoid a bump on the measured floor out of the plurality of candidates.

In the case of operating the robot in various environments, however, the configuration of the floor surface where the robot is moved is widely various. Moreover, it is difficult to prepare a plurality of candidates for the desired motion trajectory of each leg so as to be adaptable to the wide variety of floor surfaces.

Therefore, the technique disclosed in Patent Document 1 described above easily causes a situation where it is impossible to find a desired motion trajectory able to appropriately move the robot from the prepared candidates for the desired motion trajectory, depending on the configuration of the floor surface in the environment where the robot is to be moved. Consequently, it is difficult to move the robot in various environments.

In addition, when determining the desired motion of each leg or the like of the robot, generally the conventional robot control technique determines the desired motion on the premise that the floor surface in the operating environment of the robot has a basically constant or uniform configuration over a relatively wide range.

In the various operating environments, however, the floor surface often does not have the constant or uniform configuration over a wide range.

Therefore, it has been desired a technique of determining a motion trajectory of a leg of the robot so that the robot is able to move even in the above situation.

The present invention has been provided in view of the above background. Therefore, it is an object of the present invention to provide a device which generates a motion trajectory of a leg of a legged mobile robot so that the legged mobile robot is able to move in various environments.

SUMMARY OF THE INVENTION

In order to achieve the above object, the present invention provides a leg motion trajectory generation device for a legged mobile robot which generates a desired motion trajectory of each leg in the legged mobile robot which moves by repeating a leaving motion and a landing motion of a distal end of each of a plurality of the legs, the generation device comprising:

a floor surface information acquisition element which acquires floor surface information including at least floor surface information which is identified beforehand in each of a plurality of local regions of a floor surface in an operating environment of the robot and which represents a position and a posture of a ground-contactable surface of the distal end of each leg of the robot in each local region;

a desired landing position/posture setting element which sets a desired landing position and a desired landing posture of the distal end of a free leg, which is a leg making the leaving motion and the landing motion subsequent thereto in the moving motion of the robot, within one local region among the plurality of local regions in which the floor surface information is acquired;

a horizontal trajectory determination element which determines a desired horizontal motion trajectory of the distal end of the free leg from a ground contact position immediately before starting the leaving motion of the distal end of the free leg to the set desired landing position, so as to prevent a contact at least between the free leg and another leg;

a lower-limit height determination element which sets a plurality of sampling points on the determined desired horizontal motion trajectory and determines the lower-limit height of the distal end of the free leg, which is necessary to prevent a contact between the distal end of the free leg at the position of the sampling point and the floor surface of a local region existing at the position of the sampling point among the plurality of local regions in which the floor surface information is acquired, on the basis of the floor surface information of the local region existing at the position of the sampling point for each sampling point; and a vertical trajectory determination element which determines a desired vertical motion trajectory of the distal end of the free leg so that the height of the distal end of the free leg at the positions of the plurality of sampling points is equal to or greater than the determined lower-limit height (a first aspect of the invention).

In the present invention, a term "floor surface" is not limited to a normal indoor floor surface, but also means an outside region having a surface to be a foothold of each leg of the robot such as a ground surface (an uneven ground surface is acceptable) or a road surface.

According to the first aspect of the invention, in the case of determining the desired motion trajectory of the distal end of the free leg which makes a leaving motion and a landing motion subsequent thereto in the moving motion of the robot (legged mobile robot), the desired landing position/posture setting element, first, sets a desired landing position and a desired landing posture of the distal end of the free leg within one local region among a plurality of local regions acquired by the floor surface information acquisition element.

In this case, each local region may be a region having a relatively small area only enabling the distal end of each leg to come in contact with the ground inside the local region. Therefore, the floor surface information including information representing the position and posture of the ground-contactable surface in each local region is able to be identified beforehand with high reliability.

Therefore, the desired landing position and landing posture of the distal end of the free leg of the robot are able to be set within the local region having a ground-contactable surface appropriate for moving the robot.

The floor surface information acquired by the floor surface information acquisition element may be information measured beforehand during motion of the robot (during motion before determining the desired landing position/posture of the free leg), for example, by using a mounted range sensor or the like. Alternatively, the floor surface information may be information measured beforehand by using an appropriate measuring apparatus other than the robot before moving the robot. Moreover, the local regions adjacent to each other may have an overlap (a duplicated region).

Subsequently, the horizontal trajectory determination element determines the desired horizontal motion trajectory (the horizontal trajectory of the desired position) of the distal end of the free leg from the ground contact position immediately before starting the leaving motion of the distal end of the free leg to the desired landing position. In this case, the desired horizontal motion trajectory of the distal end of the free leg is determined so as to prevent a contact at least between the free leg and another leg. The desired horizontal motion trajectory may be a trajectory in a shape pattern determined in advance.

Thereafter, the lower-limit height determination element sets a plurality of sampling points on the determined desired horizontal motion trajectory. Furthermore, the lower-limit height determination element determines the lower-limit height of the distal end of the free leg necessary to prevent a contact between the distal end of the free leg at the position of the sampling point and the local region existing at the position of the sampling point among the plurality of local regions in which the floor surface information is acquired on the basis of the floor surface information of the local region existing at the position of the sampling point for each sampling point.

With respect to the meaning of the lower-limit height, if the distal end of the free leg exists in a position lower than the lower-limit height, the distal end of the free leg comes in contact with the contactable surface of a local region or such a contact is extremely likely to occur.

In this case, the floor surface information of each local region can be acquired as reliable information as described above. This enables the lower-limit height at the position of each sampling point on the desired horizontal motion trajectory to be appropriately determined.

Subsequently, the vertical trajectory determination element determines the desired vertical motion trajectory of the distal end of the free leg (the vertical trajectory of the desired position) so that the height of the distal end of the free leg at the positions of the plurality of sampling points is equal to or greater than the determined lower-limit height.

Thereby, the distal end of the free leg of the robot is able to be landed on the floor within a local region having a ground-contactable surface which is reliable as an appropriate ground-contactable surface among the plurality of local regions in which the floor surface information is acquired, and the desired horizontal motion trajectory and the vertical desired motion trajectory from the ground contact position immediately before starting the leaving motion of the distal end of the free leg to the desired landing position is able to be determined so as to prevent a contact between the distal end of the free leg and another leg or a floor surface.

Therefore, according to the first aspect of the invention, it is possible to generate the motion trajectory of a leg of the robot so that the legged mobile robot is able to move in various environments.

In the first aspect of the invention, the desired motion trajectory of the posture of the distal end of the free leg may employ any form as long as the trajectory continuously varies from the posture at the ground contact position immediately before starting the leaving motion of the distal end of the free leg to the desired landing posture (no discontinuous change occurs). In this case, the desired motion trajectory may employ a form in which a posture is maintained constant for a part or all of the period from the leaving to landing of the distal end of the free leg.

Similarly, the desired motion trajectory of the posture of the distal end of the supporting leg put in contact with the ground may employ any form as long as the trajectory continuously varies from the posture at the ground contact position immediately after the landing motion of the distal end of the supporting leg to the time point immediately before starting the leaving motion.

In the first aspect of the invention, preferably the local region has an area capable of including the distal end of an arbitrary single leg among the plurality of legs of the robot inside the local region (a second aspect of the invention).

According to the second aspect of the invention, the area of the local region is able to be reduced to a minimum area in a range where the distal end of each leg is able to be set inside the local region, and therefore the reliability of the floor surface information of each local region is able to be increased.

Moreover, in the first and second aspects of the invention, preferably the desired landing position/posture setting element sets the desired landing position and the desired landing posture so that, in the case where the ground-contactable surface of the local region where the desired landing position and the desired landing posture are set is a ground-contactable surface having an edge which is a boundary line of the ground-contactable surface within the local region, the area of a contact surface between the ground-contactable surface and the distal end of the leg and the posture of the distal end of the leg with respect to the direction of the edge satisfy at least a ground contact state condition determined in advance (a third aspect of the invention).

According to the third aspect of the invention, in the case where the ground-contactable surface of the local region where the desired landing position and the desired landing posture are set is a ground-contactable surface having an edge which is a boundary line of the ground-contactable surface within the local region (for example, a surface of the going of a stair or a step portion), the desired landing position and the desired landing posture are set so as to satisfy at least the ground contact state condition. This enables the ground contact state after landing of the distal end of the free leg to be controlled to one which facilitates the adjustment (an adjustment to secure the stability of the posture of the robot) of a floor reaction force acting on the distal end of the supporting leg (the leg which has been the free leg before the landing) after the landing. Consequently, the robot is able to be moved with high stability.

In the third aspect of the invention, the desired landing position/posture setting element may set the desired landing position and the desired landing posture so that the combination between the horizontal position among the desired landing positions of the distal end of the free leg and the posture in the direction about the vertical axis among the desired landing postures of the free leg satisfies a given combination condition determined in advance (a fourth aspect of the invention).

According to the fourth aspect of the invention, the combination between the horizontal position among the desired landing positions of the distal end of the free leg and the posture in the direction about the vertical axis among the desired landing postures of the free leg is able to be limited to a combination where the displacement amount of each joint of the robot does not exceed a mechanical movable range of the joint (a variable range of the displacement amount) by using the combination condition.

As the aforementioned combination condition, more specifically, it is possible to use a condition that, for example, the horizontal position fits within a given acceptable region set according to the posture in the direction about the vertical axis among the desired landing postures of the free leg (an acceptable region for use in preventing the displacement amount of each joint of the robot from exceeding a mechanical movable range of the joint).

In the first to fourth aspects of the invention, preferably the horizontal trajectory determination element determines the desired horizontal motion trajectory so that the maximum height of the supporting leg among the legs of the robot relative to the ground contact surface of the floor surface in the local region, which exists in the position on the desired horizontal motion trajectory of the distal end of the free leg among the plurality of local regions in which the floor surface information is acquired, is equal to or lower than a given value determined in advance (a fifth aspect of the invention).

According to the fifth aspect of the invention, the horizontal trajectory is able to be determined so as to prevent an excessively high floor surface from existing in a position on the desired horizontal motion trajectory of the distal end of the free leg.

Moreover, in the first to fifth aspects of the invention, the lower-limit height determination element may use a virtual free leg distal end, which is a virtual distal end determined in advance so as to have a larger size than the actual distal end of the free leg to find the maximum height of the virtual free leg distal end at which a contact occurs between the virtual free leg distal end and the floor surface of the local region which exists at the position of each sampling point and may determine the height of the distal end of the free leg defined according to the found maximum height as the lower-limit height at the sampling point (a sixth aspect of the invention).

According to the sixth aspect of the invention, the lower-limit height of the distal end of the free leg at each sampling point is determined by using a virtual free leg distal end having a larger size than the actual distal end of the free leg. Therefore, even if the floor surface information of the local region existing at the position of each sampling point has an error, it is possible to appropriately determine the lower-limit height of the distal end of the free leg which is necessary to prevent a contact between the floor surface of the local region existing at the position of the sampling point and the free leg.

Moreover, in the first to sixth aspects of the invention, the vertical trajectory determination element more specifically, for example, includes a lower-limit offset point determination element which determines a lower-limit offset point, which is a point having a horizontal position which is the same as the sampling point for each sampling point set on the desired horizontal motion trajectory between the ground contact position immediately before starting the leaving motion of the distal end of the free leg and the desired landing position and having a height position higher than the lower-limit height determined so as to correspond to the sampling point by a given offset amount, and the vertical trajectory determination element determines the desired vertical motion trajectory of the distal end of the free leg from the ground contact position immediately before starting the leaving motion of the distal end of the free leg to the desired landing position so as to pass through a lower-limit offset point having the greatest relative height to a virtual straight-line trajectory from the ground contact position immediately before starting the leaving motion of the distal end of the free leg to the desired landing position among the lower-limit offset points and so as to be a convex-shaped trajectory including each lower-limit offset point inside thereof (a seventh aspect of the invention).

According to the seventh aspect of the invention, the lower-limit offset point, which corresponds to each sampling point set on the desired horizontal motion trajectory between the ground contact position immediately before starting the leaving motion of the distal end of the free leg and the desired landing position, is a point at the position higher than the lower-limit height by a given offset amount. Therefore, a vertical trajectory where the height of the distal end of the free leg at the position of each sampling point is equal to or greater than the determined lower-limit height is able to be appropriately determined by determining the desired vertical motion trajectory of the distal end of the free leg so as to pass through a lower-limit offset point having the greatest relative height to the virtual straight-line trajectory from the ground contact position immediately before starting the leaving motion of the distal end of the free leg to the desired landing position among the lower-limit offset points and so as to be a convex-shaped trajectory including each lower-limit offset point inside thereof.

The aforementioned offset amount corresponding to each lower-limit offset point may be, for example, a predetermined constant value. Alternatively, the offset amount may be varied according to a distance between at least one of the ground contact position immediately before starting the leaving motion of the distal end of the free leg and the desired landing position and the lower-limit offset point. For example, the offset amount may be set in such a way that, as the horizontal position of the lower-limit offset point is farther away from the ground contact position immediately before starting the leaving motion of the distal end of the free leg and from the desired landing position, the offset amount is greater.

In the seventh aspect of the invention, various methods may be used for a method of determining the desired vertical motion trajectory using the vertical trajectory determination element. For example, the vertical trajectory determination element determines the desired vertical motion trajectory so that a trajectory near the ground contact position immediately before starting the leaving motion of the distal end of the free leg in the desired vertical motion trajectory is a straight-line trajectory having the greatest tilt relative to the virtual straight-line trajectory among straight lines from the ground contact position to each lower-limit offset point and so that a trajectory near the desired landing position of the distal end of the free leg in the desired vertical motion trajectory is a straight-line trajectory having the greatest tilt relative to the virtual straight-line trajectory among straight lines from the desired landing position to each lower-limit offset point (an eighth aspect of the invention).

According to the eighth aspect of the invention, the vertical trajectory immediately after starting the leaving motion of the distal end of the free leg and the vertical trajectory immediately before the landing are straight-line trajectories, and therefore the desired vertical motion trajectory of the distal end of the free leg is able to be determined so that the robot is able to make the leaving motion and the landing motion of the distal end of the free leg smoothly.

Furthermore, in the eighth aspect of the invention, the vertical trajectory determination element, for example, determines the desired vertical motion trajectory so that the maximum height of the relative height of the desired vertical motion trajectory to the virtual straight-line trajectory is equal to or lower than the relative height of the lower-limit offset point having the greatest relative height to the virtual straight-line trajectory among the lower-limit offset points (a ninth aspect of the invention).

According to the ninth aspect of the invention, the desired vertical motion trajectory of the distal end of the free leg is able to be determined so that the height of the distal end of the free leg decreases as much as possible within a range where a contact with the floor surface does not occur.

BRIEF DESCRIPTION OF THE DRAWINGS

FIGS. 14A, 14B, and 14C are diagrams illustrating examples of the normalized vertical trajectory determined by the processing of the flowchart in FIG. 13;

DESCRIPTION OF THE PREFERRED EMBODIMENTS

One embodiment of the present invention will be described below with reference to FIGS. 1 to 16.

Figure 1:
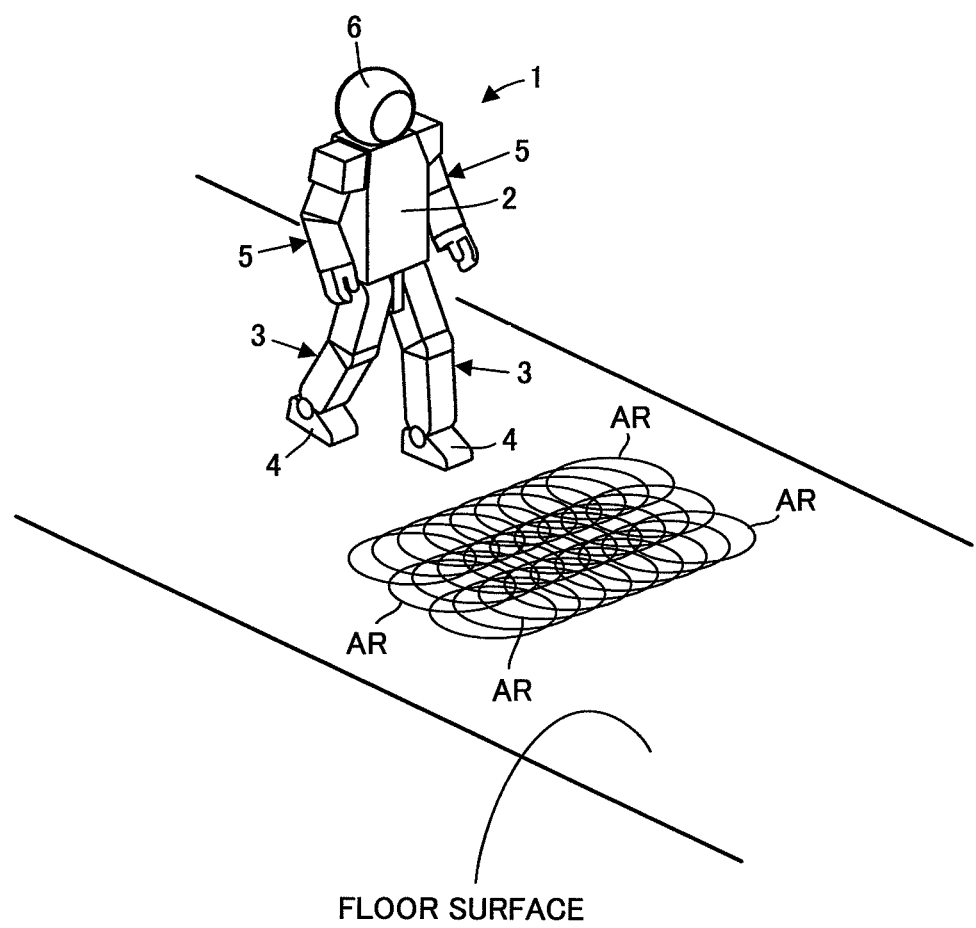
FIG. 1 is a diagram illustrating a schematic configuration of a legged mobile robot according to one embodiment of the present invention.

Referring to FIG. 1, the legged mobile robot 1 of this embodiment is a biped locomotion robot and has a pair of right and left legs (leg links) 3 and 3 which are extended from a body 2 as a base. While the detailed illustration is omitted, each leg 3 has a well-known link structure with six joints between a foot 4 which forms a distal end of the leg 3 and the body 2. In addition, the joints of each leg 3 are driven by a joint actuator 10 (illustrated in FIG. 2) formed by an electric motor and the like, thereby enabling a motion with six degrees of freedom (three-axis translational motion and three-axis rotational motion) of the foot 4 of each leg 3.

Although the legged mobile robot 1 (hereinafter, simply referred to as "robot 1") illustrated in FIG. 1 is described as a robot having a pair of right and left arms 5 and 5 and a head 6, the robot 1 does not always need to have the pair of right and left arms 5 and 5 and the head 6.

Moreover, each leg 3 of the robot 1 may be configured to have seven or more degrees of freedom.

Figure 2:
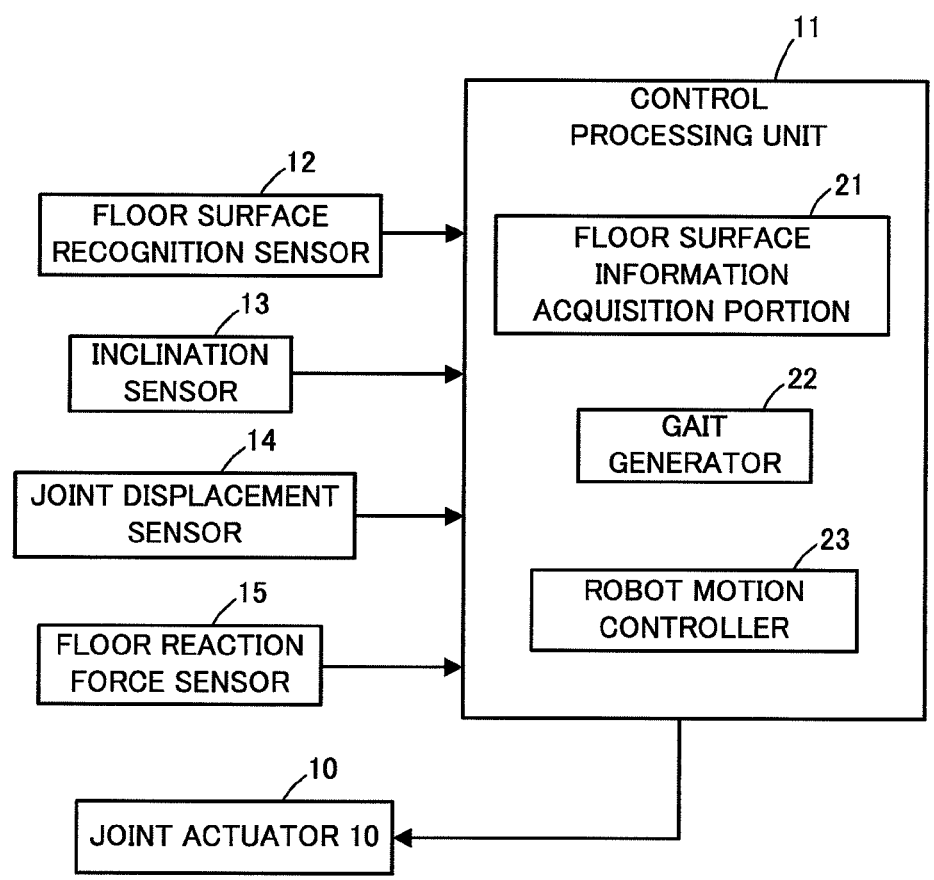
FIG. 2 is a block diagram illustrating a configuration for controlling the motion of the robot illustrated in FIG. 1.

As illustrated in FIG. 2, the robot 1 is equipped with a joint actuator 10 which drives respective joints, a control processing unit 11 which is composed of an electronic circuit unit including a CPU, a RAM, a ROM, an interface circuit, and the like, and various sensors such as a floor surface recognition sensor 12 for use in recognizing the floor surface in the operating environment of the robot 1.

The floor surface recognition sensor 12 is capable of measuring a distance between the floor surface recognition sensor 12 and each portion of the floor surface around the robot 1 and is composed of, for example, a stereo camera, a laser range sensor, or the like. The floor surface recognition sensor 12 intends to measure the floor surface of a given region around the robot 1 including a region near the robot 1 ahead in the moving direction of the robot 1 and is mounted on the chest of the body 2, the head 6, or the like of the robot 1 so as to be able to measure a distance from the floor surface recognition sensor 12 to each portion of the floor surface to be measured.

The control processing unit 11 has, as main functions implemented by an installed program or the like, a floor surface information acquisition portion 21 which acquires floor surface information enabling recognition of where and with what posture (tilt) a ground-contactable surface on which the foot 4 of each leg 3 of the robot 1 is able to be placed exists in the floor surface in the operating environment of the robot 1, a gait generator 22 which generates a desired gait of the robot 1, and a robot motion controller 23 which controls the displacement amount of each joint of the robot 1 so that the actual motion of the robot 1 follows the desired gait.

In addition to the floor surface recognition sensor 12, to control the motion of the robot 1 with the robot motion controller 23, the robot 1 is also equipped with an inclination sensor 13 which is used to measure an actual posture of the body 2 of the robot 1 (more specifically, a tilt angle of a trunk axis of the body 2 relative to the vertical direction or the horizontal direction), a joint displacement sensor 14 which is used to measure an actual displacement amount of each joint of the robot 1, and a floor reaction force sensor 15 which is used to measure an actual floor reaction force acting on each foot 4 of the robot 1.

In this case, the inclination sensor 13 includes, for example, an angular velocity sensor such as a gyro sensor and an accelerometer. The joint displacement sensor 14 includes, for example, a rotary encoder and a potentiometer. The floor reaction force sensor 15 includes, for example, a six-axis force sensor.

Here, schematic processing of the control processing unit 11 for moving the robot 1 will be described below.

The control processing unit 11 performs the processing of the floor surface information acquisition portion 21 in parallel with the motion control of the robot 1 to acquire floor surface information around the robot 1 (mainly the region ahead in the moving direction of the robot 1). In this case, in this embodiment, the floor surface information acquisition portion 21 determines the floor surface information on each of a plurality of local regions AR (See FIG. 1) virtually arranged on the floor surface to be measured of the floor surface recognition sensor 12 on the basis of the measured data of the floor surface recognition sensor 12, thereby acquiring the floor surface information of each local region AR as observation data. Then, the floor surface information acquisition portion 21 accumulates and stores the floor surface information acquired as observation data in a form of a database in a storage device, which is not illustrated, of the robot 1.

Furthermore, the control processing unit 11 performs the processing of the gait generator 22 by using floor surface information acquired by the floor surface information acquisition portion 21 to generate a desired gait for the robot 1 to move. The desired gait is, for example, a gait for causing the robot 1 to move by repeating a leaving motion of each leg 3 of the robot 1 (a motion of moving the foot 4 in contact with the floor from the floor surface to the air) and a subsequent landing motion (a motion of landing the foot 4 from the air to the floor surface) alternately by the legs 3 and 3 such as, for example, a gait for causing the robot 1 to walk or to run.

The desired gait may be a gait in which, with one leg 3 of the robot 1 off the floor, a leaving motion and a landing motion subsequent thereto are made once or a plurality of times by the other leg 3, in other words, a gait in which a hop is done on one leg 3 of the robot 1. Alternatively, the desired gait may be a gait in which the robot 1 moves sideways.

In this embodiment, the desired gait generated by the gait generator 22 includes, as constituent elements, a desired foot position/posture trajectory which is a trajectory of the desired position and the desired posture of the foot 4 (hereinafter, generically referred to as "desired foot position/posture") of each leg 3 of the robot 1, a desired body position/posture trajectory which is a trajectory of the desired position and the desired posture of the body 2 (hereinafter, generically referred to as "desired body position/posture") of the robot 1, and a desired ZMP trajectory which is a trajectory of the desired position of a zero moment point (ZMP) (hereinafter, referred to as "desired ZMP").

The aforementioned "trajectory" means the time series of an instantaneous value of a position or a posture. Moreover, the desired posture of each foot 4 means a spatial desired direction of the foot 4, and the desired position of each foot 4 means a spatial desired position of an arbitrary representative point determined in advance of the foot 4. The same holds true for the desired posture and the desired position of the body 2.

In this embodiment, the desired foot position/posture trajectory of the foot 4 of each leg 3 corresponds to the desired motion trajectory of each leg in the present invention.

Figure 3A:
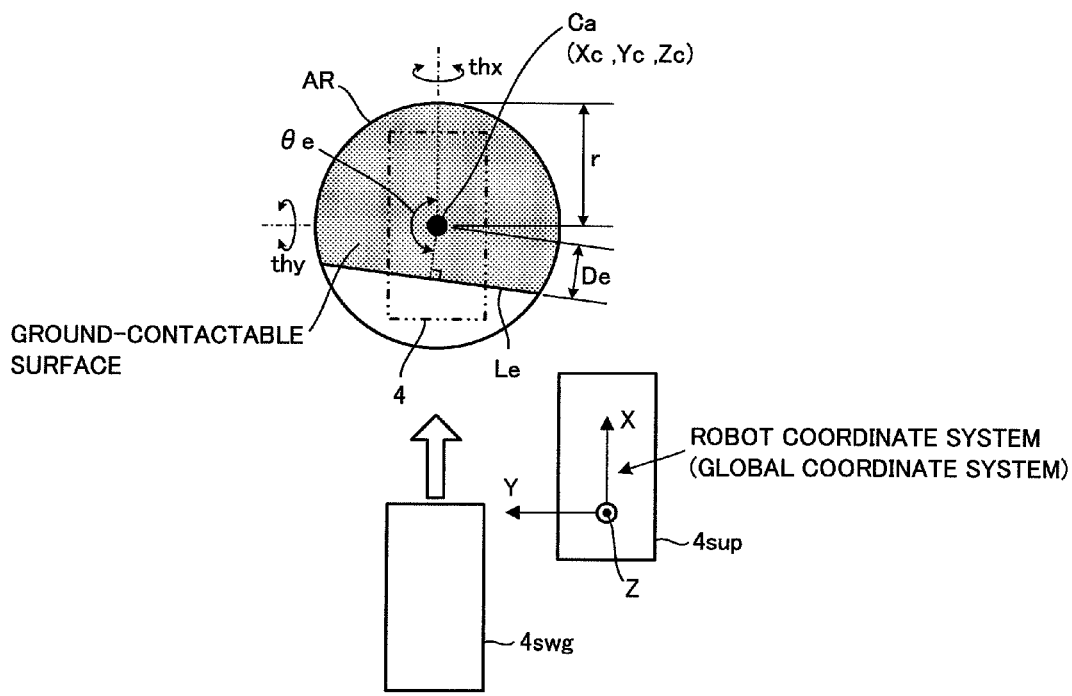
FIGS. 3A and 3B are diagrams for describing floor surface information acquired by a floor surface information acquisition portion illustrated in FIG. 2.

The constituent elements of the desired gait are each described as a trajectory of the position or posture in the robot coordinate system (illustrated in FIG. 3A).

The aforementioned robot coordinate system is a global coordinate system (an inertial coordinate system) which is set in a fixed manner to the floor surface during a period of one step (or a period of a plurality of steps) of the robot 1 in order to describe the desired foot position/posture trajectory or the like in the period. In this embodiment, as illustrated in FIG. 3A, the robot coordinate system is a three-axis orthogonal coordinate system which has an origin in the directly-below position of a given portion of a supporting leg's foot 4sup (for example, the directly-below position of the heel of the supporting leg's foot 4sup) on a ground contact surface (or a plane containing the ground contact surface) of the supporting leg's foot 4sup which is the foot 4 of a supporting leg (the leg 3 on the side of supporting the weight of the robot 1 while the robot 1 moves) of the legs 3 and 3 of the robot 1 and in which the horizontal axis in the back-and-forth direction of the supporting leg's foot 4sup and the horizontal axis in the right-and-left direction (the lateral direction) are the X axis and the Y axis, respectively, and the vertical axis is the Z axis. The X axis, the Y axis, and the Z axis, in other words, correspond to the roll axis, the pitch axis, and the yaw axis, respectively.

Therefore, the robot coordinate system in this embodiment is a global coordinate system in which the origin position thereof and the directions of the X axis and the Y axis (the directions about the Z axis) are set so as to be updated every time the supporting leg's foot 4sup changes from one to the other of the feet 4 and 4. Hereinafter, unless otherwise specified, it is assumed that the X axis, the Y axis, and the Z axis mean the coordinate axes of the robot coordinate system.

The robot coordinate system, however, may be a global coordinate system which is maintained with fixed position and posture relative to the floor surface constantly or in a moving period of a plurality of steps of the robot 1.

In the case where the robot 1 has a movable part relative to the body 2 in addition to the legs 3 and 3, the desired gait includes a desired motion trajectory of the movable part. For example, the robot 1 illustrated in FIG. 1 has the arms 5 and 5 movable relative to the body 2 and therefore the desired gait generated by the gait generator 22 includes a desired arm posture trajectory which is the trajectory of a desired posture of each arm 5 (hereinafter, referred to as "desired arm posture"). The desired arm posture means a relative desired posture of each entire arm 5 relative to the body 2 in this embodiment.

Additionally, each leg 3 of the robot 1 in this embodiment has six degrees of freedom and therefore the desired displacement amount of each joint of each leg 3 is uniquely determined by the geometric calculation (kinematics calculation) based on a geometric model of the robot 1 from the desired foot position/posture of each foot 4 and the desired body position/posture.

In this embodiment, the gait generator 22 generates unit gaits in sequence during the moving motion of the robot 1, where the unit gait is a desired gait in a period (a period of one step) from the landing of one or both of the legs 3 and 3 on the floor to the landing of a leg 3 (one leg or both legs) which has once left the floor. The unit gait is generated anew every time the leg 3 to be the next supporting leg lands on the floor from the leaving state. In this case, unit gaits of a predetermined number of steps including the future steps are generated.

Here, for example, in the aforementioned unit gait, the legs 3 and 3 land on the floor alternately (the supporting leg and the free leg are alternated), for example, in the walking or running motion, and therefore the unit gait is intended for a period from the landing of the free leg's foot 4swg (the leg 3 having the free leg's foot 4swg is to be the next supporting leg) to the landing of the next free leg's foot 4swg.

Meanwhile, in one-leg jumping motion (one-leg hopping motion), any one leg 3 repeats the landing or leaving motion (the supporting leg is the same) and therefore the unit gait is a gait for a period from the landing of the supporting leg's foot 4sup to the landing of the next supporting leg's foot 4sup.

In this embodiment, as a main example, there is assumed a case where a desired gait for making the walking motion of the robot 1 is generated. Further, the following description is provided assuming that the unit gait is a gait in which a starting point is a time point at which the free leg's foot 4swg lands on the floor and the leg 3 having the free leg's foot 4swg changes to a supporting leg and an end point is a time point at which the free leg which is the other leg 3 lands on the floor again after leaving the floor. Moreover, hereinafter, a unit gait to be generated anew every time the free leg's foot 4swg lands on the floor is referred to as "current time gait" in some cases.

The timing at the beginning of the aforementioned unit gait (=timing at the end of the last unit gait) is not limited to the timing at the landing moment when the foot 4 of one leg 3 changes from the leaving state to the landing state, but may be set to an arbitrary timing during ground contact after the landing of the foot 4. Furthermore, the unit gait may be generated every arbitrary time period which is independent of the changeover timing of the gait.

The generation of the unit gait is generally performed as described below. Specifically, the gait generator 22, first, determines a foot position/posture trajectory parameter which is a parameter defining a desired foot position/posture trajectory of the current time gait by using the floor surface information acquired by the floor surface information acquisition portion 21 so as to satisfy requests for the moving direction, the moving speed, and the like of the robot 1 and so that the robot 1 is able to move stably without stumbling.

In this case, also a foot position/posture trajectory parameter for one or a plurality of unit gaits following the current time gait is provisionally determined. The determination is made to determine a virtual periodic gait which is a convergence target of a future gait following the current time gait. The periodic gait is a gait in which a moving motion of the same pattern of the robot 1 is periodically repeated. Therefore, the periodic gait is a gait in which the robot 1 is able to move continuously keeping a firm posture.

Furthermore, the gait generator 22 determines a ZMP trajectory parameter which is a parameter defining the desired ZMP trajectory of the current time gait so that the desired ZMP continuously and smoothly moves within a so-called supporting polygon region (a region where the ZMP is able to exist) which is defined according to the desired foot position/posture trajectory of the feet 4 and 4 and so that the current time gait becomes a gait capable of converging to the virtual periodic gait in the future.

In a state where only the foot 4 of one leg 3 of the legs 3 and 3 is in contact with the ground (one-leg supporting state), the supporting polygon corresponds to a region of the ground contact surface of the foot 4. In a state where both of the feet 4 and 4 of the legs 3 and 3 are in contact with the ground (two-leg supporting state), the supporting polygon corresponds to a region of the concatenated ground contact surfaces of the feet 4 and 4.

Then, the gait generator 22 determines a body position/posture trajectory parameter which is a parameter defining the desired body position/posture trajectory of the current time gait by using a dynamic model of the robot 1 determined in advance so as to satisfy the desired ZMP trajectory (so as to cause components about the horizontal axis [a component about the X axis and a component about the Y axis in the robot coordinate system] of a moment which occurs about the desired ZMP due to a resultant force between an inertial force generated by the motion of the robot 1 and the gravitational force acting on the robot 1 to be zero).

Additionally, for example, in the case where the actual tilt angle of the body 2 measured from the output of the inclination sensor 13 has a deviation relative to the tilt angle in the desired posture of the body 2 or in the case where the horizontal position of the overall center-of-gravity of the robot 1 (the position in the X-axis direction and in the Y-axis direction in the robot coordinate system) which is estimated on the basis of a geometric model of the robot 1 from the output of the inclination sensor 13 and the output of the joint displacement sensor 14 has a deviation relative to the horizontal position of the overall center-of-gravity in the desired gait of the robot 1, the desired body position/posture trajectory may be determined so that the components about the horizontal axis of the moment which occurs about the desired ZMP due to the resultant force forms the moment determined according to the deviation so as to reduce the deviation.

Further, the gait generator 22 determines an arm posture trajectory parameter, which is a parameter defining the desired arm posture trajectory of each arm 5 in the current time gait, by using the dynamic model of the robot 1, for example, so as to counteract an inertial force moment which occurs about the yaw axis (about the Z axis in the robot coordinate system) in response to the motion of each foot 4 according to the desired foot position/posture trajectory. The desired arm posture trajectory of each arm 5 may be a trajectory in which the relative posture of each entire arm 5 to the body 2 (consequently, a displacement amount of each joint of the arm 5) is maintained constant.

The foot position/posture trajectory parameter is a parameter from which the desired foot position/posture trajectory is able to be determined by predetermined arithmetic processing and is composed of, for example, a position, a posture, and the like at a plurality of specific instantaneous points on the desired foot position/posture trajectory. The same holds true for the ZMP trajectory parameter, the body position/posture trajectory parameter, and the arm posture trajectory parameter. Hereinafter, these parameters will be generically referred to as "gait parameter" in some cases.

The control processing unit 11 further performs the processing of the robot motion controller 23 according to the gait parameter determined by the gait generator 22 as described above.

Specifically, the robot motion controller 23 sequentially determines the instantaneous values of the desired displacement amounts of the respective joints of each arm 5 from the desired arm posture trajectory which is defined by the arm posture trajectory parameter.

Moreover, the robot motion controller 23 sequentially determines the instantaneous values of the desired displacement amounts of the respective joints of each leg 3 by a geometric calculation, basically from the desired foot position/posture trajectory defined by the foot position/posture trajectory parameter of each foot 4 and the desired body position/posture trajectory defined by the body position/posture trajectory parameter.

In this embodiment, however, the desired foot position/posture trajectory of each foot 4 is appropriately corrected from one determined by the gait generator 22 in order to prevent, as much as possible, the actual tilt angle of the body 2, which is measured from the output of the inclination sensor 13, from deviating from a desired tilt angle in the desired body position/posture (or the horizontal position of the overall center-of-gravity of the robot 1 from deviating from the horizontal position of the overall center-of-gravity in the desired gait) or to prevent, as much as possible, the actual ZMP of the robot 1 from diverging from the desired ZMP, both of which are caused by an error in the floor surface information, a disturbance, or the like. In addition, the instantaneous values of the desired displacement amount at each joint of each leg 3 are sequentially determined from the desired foot position/posture trajectory and the desired body position/posture trajectory after the correction.

To be more specific, the desired foot position/posture trajectory is corrected, for example, as described below. Specifically, in the case of an occurrence of deviation between an actual tilt angle of the body 2 measured from the output of the inclination sensor 13 and a desired tilt angle in the desired body position/posture (or in the case of an occurrence of deviation between the horizontal position of the overall center-of-gravity of the robot 1 estimated on the basis of the geometric model of the robot 1 from the output of the inclination sensor 13 and the output of the joint displacement sensor 14 and the horizontal position of the overall center-of-gravity in the desired gait of the robot 1), a compensating moment about the horizontal axis (about the X axis and about the Y axis in the robot coordinate system) additionally generated about the desired ZMP is determined according to the deviation in order to reduce the error.

Then, the desired foot position/posture trajectory is corrected by so-called "compliance control" so as to bring the components about the horizontal axis of the actual moment about the desired ZMP measured from the output of the floor reaction force sensor 15 close to the compensating moment.

In addition, in the case where the compensating moment is zero such as a case of no occurrence of a deviation between the actual tilt angle of the body 2 and the desired tilt angle (or a deviation between the actual horizontal position of the overall center-of-gravity of the robot 1 and the desired horizontal position), the desired foot position/posture of each foot 4 in contact with the ground is corrected so as to bring the components about the horizontal axis of the actual moment about the desired ZMP measured from the output of the floor reaction force sensor 15 close to zero, namely the original desired moment about the desired ZMP.

The robot motion controller 23 controls the driving force of the joint actuator 10 corresponding to each joint so as to cause the actual displacement amount of each joint measured from the output of the joint displacement sensor 14 to follow the time series of the instantaneous values of the desired displacement amount of each joint of the robot 1 (in other words, the trajectory of the desired displacement amount) sequentially determined as described above by the feedback control.

This completes the outline of the control processing of the control processing unit 11. In the control processing, processing other than the processing of the floor surface information acquisition portion 21 and the determination processing of the desired foot position/posture trajectory (the determination processing of the foot position/posture trajectory parameter) of the processing of the gait generator 22 is, more specifically, performed in the same manner as for the processing, for example, described in detail by the applicant of the present application in Japanese Patent No. 3726081 or Japanese Patent No. 3674789.

Accordingly, in the following description of this embodiment, the processing of the floor surface information acquisition portion 21 and the processing of the desired foot position/posture trajectory in the gait generator 22 will be described in more detail. The processing particularly relates to the invention of the present patent application.

In this embodiment, floor surface information acquired by the floor surface information acquisition portion 21 is of each of a plurality of local regions AR virtually arranged on the floor surface in the operating environment of the robot 1. Each local area AR is, in this embodiment, a circular region as illustrated in FIG. 1 and FIG. 3A. Moreover, the size (the area or the diameter) of each local region AR is set to a size determined in advance (for example, the size in which the diameter of the local region AR is slightly larger than the maximum length of the foot 4 of each leg 3) so that the entire flat portion of the bottom surface of the foot 4 of one arbitrary leg 3 of the robot 1 is able to fit within the local region AR as illustrated in FIG. 3A.

The floor surface information acquisition portion 21 virtually arranges the local regions AR each having the above shape and size as illustrated in FIG. 1 so that the local regions AR are distributed on the floor surface of a region to be measured by the floor surface recognition sensor 12 such as a region ahead in the moving direction of the robot 1 (more specifically, so that local regions AR adjacent to each other partially overlap, when the floor surface is viewed from above). Further, the floor surface information acquisition portion 21 finds the floor surface information for each local region AR.

The distribution pattern of the plurality of local areas AR on the floor surface may be either a regular distribution pattern such as a matrix array or an irregular distribution pattern. Moreover, the shape of the local region AR is not limited to a circular shape, but may be quadrangular, hexagonal, or any other polygonal shape. Furthermore, in the case where the floor surface recognition sensor 12 is composed of a stereo camera, the positions where the local regions AR are arranged may be set on a captured image of the camera.

In this embodiment, the floor surface information acquisition portion 21 acquires the floor surface information for each local region AR virtually arranged in the region to be measured by the floor surface recognition sensor 12 on the basis of the measured data of the floor surface recognition sensor 12 during the motion of the robot 1. Then, the floor surface information acquisition portion 21 stores the acquired floor surface information of each local region AR into a storage device which is not illustrated.

Here, if the floor surface recognition sensor 12 is composed of a laser range sensor or the like, the measured data (range data) includes an orientation (an orientation viewed from the sensor 12) of a part in which the distance of the floor surface to be measured has been measured and the measured value of the distance in the orientation. The measured data enables the recognition of the spatial positions of the respective parts of the floor surface relative to the floor surface recognition sensor 12.

Meanwhile, if the floor surface recognition sensor 12 is composed of a stereo camera and the luminance values of a captured image of the camera are acquired as measured data, the floor surface information acquisition portion 21 performs processing of finding a range image or a plane parameter of the floor surface to be measured (a distance from one camera of the stereo camera to the floor surface and a normal vector of the floor surface) from the measured data. The range image is acquired by finding the distance at each pixel position of the captured image of one camera constituting the stereo camera on the basis of parallax between the cameras of the stereo camera. Then, the spatial position of each part of the floor surface relative to the floor surface recognition sensor 12 is recognized by using the range image.

Moreover, the above plane parameter is estimated by performing a projective transformation using the plane parameter of the floor surface to be measured between the given regions of two images of the stereo camera. The floor surface information is acquired from the estimated plane parameter and the positions where the local regions AR are arranged.

The floor surface information of each local region AR includes a plurality of types of data indicating whether the ground-contactable surface of the foot 4 of each leg 3 of the robot 1 exists in each local region AR, the spatial position in which the ground-contactable surface exists, the spatial posture (direction) of the ground-contactable surface, and the like.

To be more specific, the floor surface information acquisition portion 21 acquires (determines) the following data as the floor surface information of each local region AR. Specifically, the floor surface information acquisition portion 21 determines the value of a ground-contactability indication flag which indicates whether a ground-contactable surface exists in each local region AR by ON (value "1") or OFF (value "0") as one of data constituting the floor surface information of the local region AR.

In this case, for example, if it is recognized that a flat surface whose tilt relative to the horizontal plane is within a given range and whose area is equal to or larger than a given area exists within the local region AR on the basis of the measured data of the floor surface recognition sensor 12 in the local region AR, it is judged that a ground-contactable surface exists in the local region AR. Moreover, unless the above flat surface exists within the local region AR, it is judged that any ground-contactable surface does not exist in the local region AR. Although the flat surface may be a part of a plane naturally, it may be a nearly flat surface with sufficiently small curvature.

Furthermore, if a ground-contactable surface exists in a local region AR, the local region AR is assumed to be a region on a plane containing the ground-contactable surface.

Here, if the local region AR is arranged on a relatively wide flat floor surface existing in the operating environment of the robot 1, the entire local region AR is a ground-contactable surface.

Figure 3B:
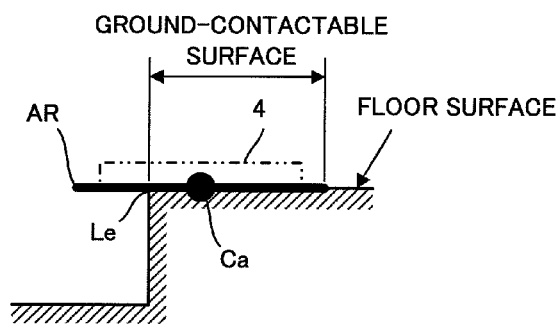

Meanwhile, if the local region AR is arranged so as to partially run off the flat going as a ground-contactable surface of a step portion relative to the floor surface having the step portion (for example, a stepped floor surface), for example, as illustrated in FIG. 3B, the ground-contactable surface in this local region AR is, for example, a region as indicated by stippling in FIG. 3A. In this case, the ground-contactable surface existing in the local region AR has a boundary line Le corresponding to an edge of the going of the step portion within the local region AR.

Therefore, if a ground-contactable surface exists in the local region AR, the floor surface information acquisition portion 21 determines the coordinate values (Xc, Yc, Zc) of the spatial position of a central point Ca as a representative point of the local region AR, the inclination angle (thx, thy) representing a spatial posture of the ground-contactable surface (=a spatial posture of the local region AR), a radius r (or a diameter) of the local region AR, a distance De from a central point Car of the local region AR to a boundary line Le (edge) of the ground-contactable surface within the local region AR, and a tilt angle θe of the boundary line Le as data constituting the floor surface information of the local region AR, in addition to the ground-contactability indication flag.

In this case, the spatial position of the central point Ca of the local region AR corresponds to the arrangement position of the local region AR, and the coordinate values (Xc, Yc, Zc) of the central point are those viewed in the robot coordinate system.

Moreover, the inclination angle (thx, thy) representing the spatial posture of the ground-contactable surface of the local region AR (=the spatial posture of the local region AR) is composed of an inclination angle thx about the X axis and an inclination angle thy about the Y axis of the ground-contactable surface viewed in the aforementioned robot coordinate system.

Further, the tilt angle θe of the boundary line Le of the ground-contactable surface is a tilt angle about the Z axis in the robot coordinate system. In the illustrated diagram, the tilt angle θe is represented as an angle formed by a perpendicular line from the central point Ca of the local region AR to the boundary line Le relative to the X-axis direction of the robot coordinate system.

Then, the floor surface information acquisition portion 21 determines the coordinate values (Xc, Yc, Zc) of the central point Ca of the local region AR, the inclination angle (thx, thy), the distance De, and the tilt angle θe on the basis of the measured data of the floor surface recognition sensor 12.

Thus, the data constituting the floor surface information of each local region AR determined as described above identifies whether a ground-contactable surface exists in each local region AR, the ground-contactable surface existing in the local region AR and the spatial position of the boundary line Le of the ground-contactable surface, the spatial posture of the ground-contactable surface, and the like.

Additionally, in the case where the entire local region AR is a ground-contactable surface, for example, the above De value is set to a given value equal to or greater than the radius r of the local region AR, or a value of a flag indicating that there is no boundary line Le is set as another data constituting the floor surface information. This informs whether the entire local region AR is a ground-contactable surface. In this case, although the θe value is unnecessary, it may be set to an arbitrary value.

Unless the ground-contactable surface exists in the local region AR, for example, data representing the position of the central point Ca of the local region AR and the position and posture of the surface existing in the highest position within the local region AR is set as data constituting the floor surface information of the local region AR, in addition to the ground-contactability indication flag.

This completes the detailed description of the processing of the floor surface information acquisition portion 21. In addition, the measurement by the floor surface recognition sensor 12 relative to the floor surface to be measured including the plurality of local regions AR may be performed a plurality of times during the motion of the robot 1 to update the values of data constituting the floor surface information of each local region AR appropriately. Moreover, the floor surface information of each local region AR may be previously created before starting the motion of the robot 1 by using an appropriate measuring device which is different from the floor surface recognition sensor 12 to store the floor surface information into a storage device of the robot 1 in advance or to supply the floor surface information to the robot 1 from an external server by wireless communication or the like as needed.

Subsequently, processing for determining the desired foot position/posture trajectory by the gait generator 22 will be described. The following description is made supposing the case of generating, for example, a gait of a walking motion of the robot 1 as a desired gait, for convenience of understanding.

Figure 4:
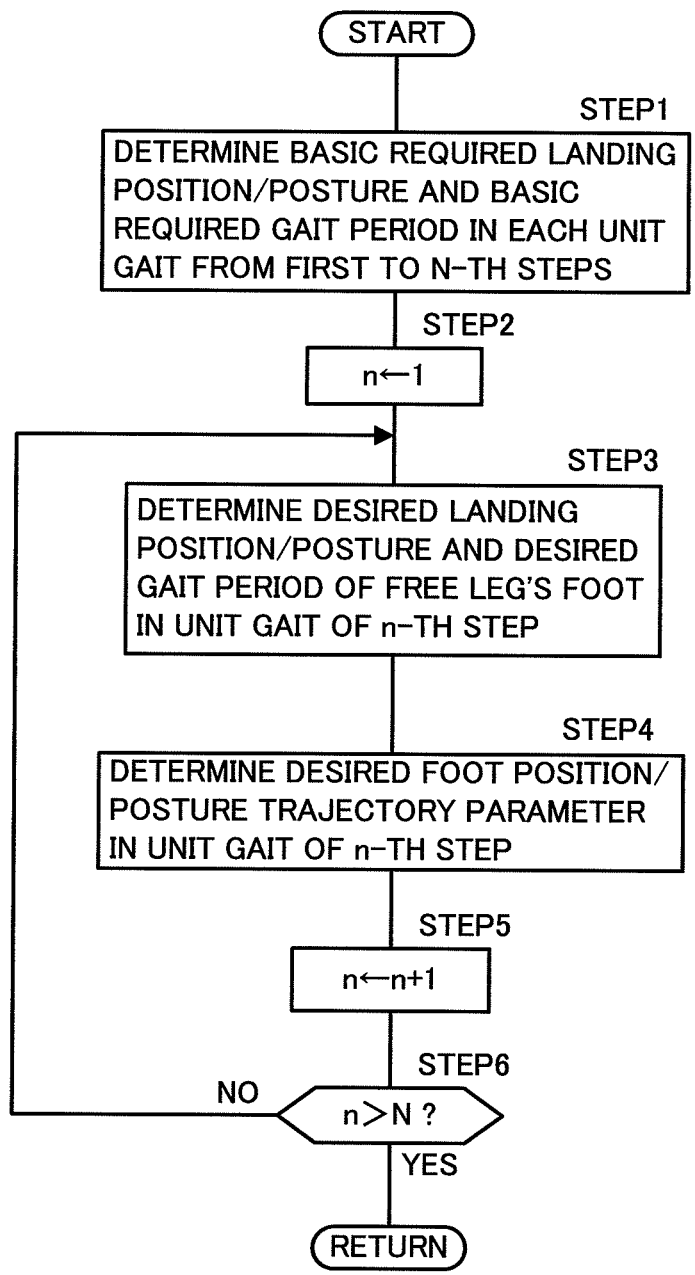
FIG. 4 is a flowchart illustrating the processing of a substantial part of a gait generator illustrated in FIG. 2.

The processing of determining the desired foot position/posture trajectory by the gait generator 22 is performed as illustrated in the flowchart of FIG. 4. First, in STEP 1, the gait generator 22 determines a basic required landing position/posture as a basic required value of the landing position/posture of the free leg's foot 4swg of each unit gait from the first step to the N-th step (N: 2 or more predetermined integer) and a basic required gait period as a basic required value of a required time for each unit gait (a required time from the beginning to the end of the unit gait) up to the N-th step, on the basis of the movement plan of the robot 1 which is appropriately supplied from a server external to the robot 1, a movement plan taught beforehand to the robot 1, a move command supplied from an operating device external to the robot 1, or other requests related to the moving direction or the moving speed of the robot 1. In this embodiment, the value of the integer N is, for example, "2."

In this specification, the landing position/posture of the free leg's foot 4swg in this embodiment means the typical position and posture of the free leg's foot 4swg in contact with the ground from the landing moment at which the free leg's foot 4swg shifts from the leaving state to the landing state. In this embodiment, the landing position/posture is, for example, the position and posture of the free leg's foot 4swg in a standard posture state in which the bottom surface of the free leg's foot 4swg is placed on the floor surface in a posture parallel to the floor surface (ground-contactable surface) at the landing spot.

Although naturally the landing position/posture of the free leg's foot 4swg in the standard posture state may be different from the position and posture at the landing moment of the free leg's foot 4swg, the landing position/posture may be the same as the position and posture at the landing moment.

Additionally, in the case where the origin position and posture (the directions of the X axis and the Y axis) in the robot coordinate system are set so as to correspond to the position and posture of the supporting leg's foot 4sup, the landing position/posture (the landing position/posture in the standard posture state) of the free leg's foot 4swg in the unit gait of the n-th step defines the origin position and posture in the robot coordinate system corresponding to the supporting leg's foot 4sup (=the free leg's foot 4swg landed on the floor in the unit gait of the n-th step) in the unit gait following the unit gait of the n-th step (the unit gait of the (n+1)th step).

Specifically, the robot coordinate system corresponding to the supporting leg's foot 4sup in the unit gait of the (n+1)th step is defined as a coordinate system with the origin on the floor surface directly below a given portion of the supporting leg's foot 4sup whose position and posture conformed to the landing position/posture of the free leg's foot 4swg in the unit gait of the n-th step and with the horizontal axis in the back-and-forth direction and the horizontal axis in the right-and-left direction of the supporting leg's foot 4sup as the X axis and the Y axis, respectively.

Therefore, determining the landing position/posture (the landing position/posture in the standard posture state) of the free leg's foot 4swg in each unit gait is substantially equivalent to determining the origin position and posture (the directions of the respective coordinate axes) in the robot coordinate system corresponding to the supporting leg's foot 4sup in the next unit gait.

The basic required landing position/posture determined in STEP 1 is, more specifically, the landing position/posture of the free leg's foot 4swg viewed in the Z-axis direction (vertical axis direction). Therefore, the basic required landing position/posture is composed of a desired position in the horizontal direction (the X-axis direction and the Y-axis direction) of the free leg's foot 4swg placed on the floor surface in the standard posture state and a desired posture about the Z axis of the free leg's foot 4swg.

In STEP 1, the basic required landing position/posture and the basic required gait period are determined so as to comply with provided requests as far as possible. For example, the basic required landing position/posture and the basic required gait period are determined so that the average moving speed in the periods of the unit gaits up to the N-th step of the robot 1 or the entire period up to the N-th step coincides with the moving speed required for the movement plan or the like and the moving direction of the robot 1 in the period coincides with the moving direction required for the movement plan or the like.

In addition, it is possible to set an acceptable limit (an upper limit) on a step length (the length of one step) in each unit gait of the robot 1 and on a gait period (required time for one step) of each unit gait. In the case where the step length or the gait period of each unit gait up to the N-th step deviates from the acceptable limit when the basic required landing position/posture and the basic required gait period are determined as requested, the basic required landing position/posture or the basic required gait period may be limited so as to satisfy the acceptable range.

Subsequently, the gait generator 22 initializes the value of n representing the number of steps (the order of the unit gait) to "1" in STEP 2 and then performs the process of STEP 3. In STEP 3, the gait generator 22 determines the desired landing position/posture and the desired gait period of the free leg's foot 4swg of the n-th step. The details of this process will be described later.

Subsequently, in STEP 4, the gait generator 22 determines a desired foot position/posture trajectory parameter, which is a parameter defining the desired foot position/posture trajectory in the unit gait of the n-th step. The details of this processing will be described later, too.

Subsequently, the gait generator 22 increases the value of n by only "1" in STEP 5 and then decides whether n>N is satisfied in STEP 6. If the decision result of STEP 6 is negative (if n≤N), the gait generator 22 performs the processes of STEPS 3 and 4 related to the unit gait of a new n-th step. Furthermore, the gait generator 22 sequentially performs the processes of STEPS 5 and 6.

Then, if the decision result of STEP 6 is finally affirmative, in other words, when the processes of STEPS 3 and 4 corresponding to each unit gait up to the N-th step are completed, the processing of the flowchart of FIG. 4 ends. This determines the desired foot position/posture trajectory parameters in the respective unit gaits from the first step to the N-th step in order.

Figure 5:
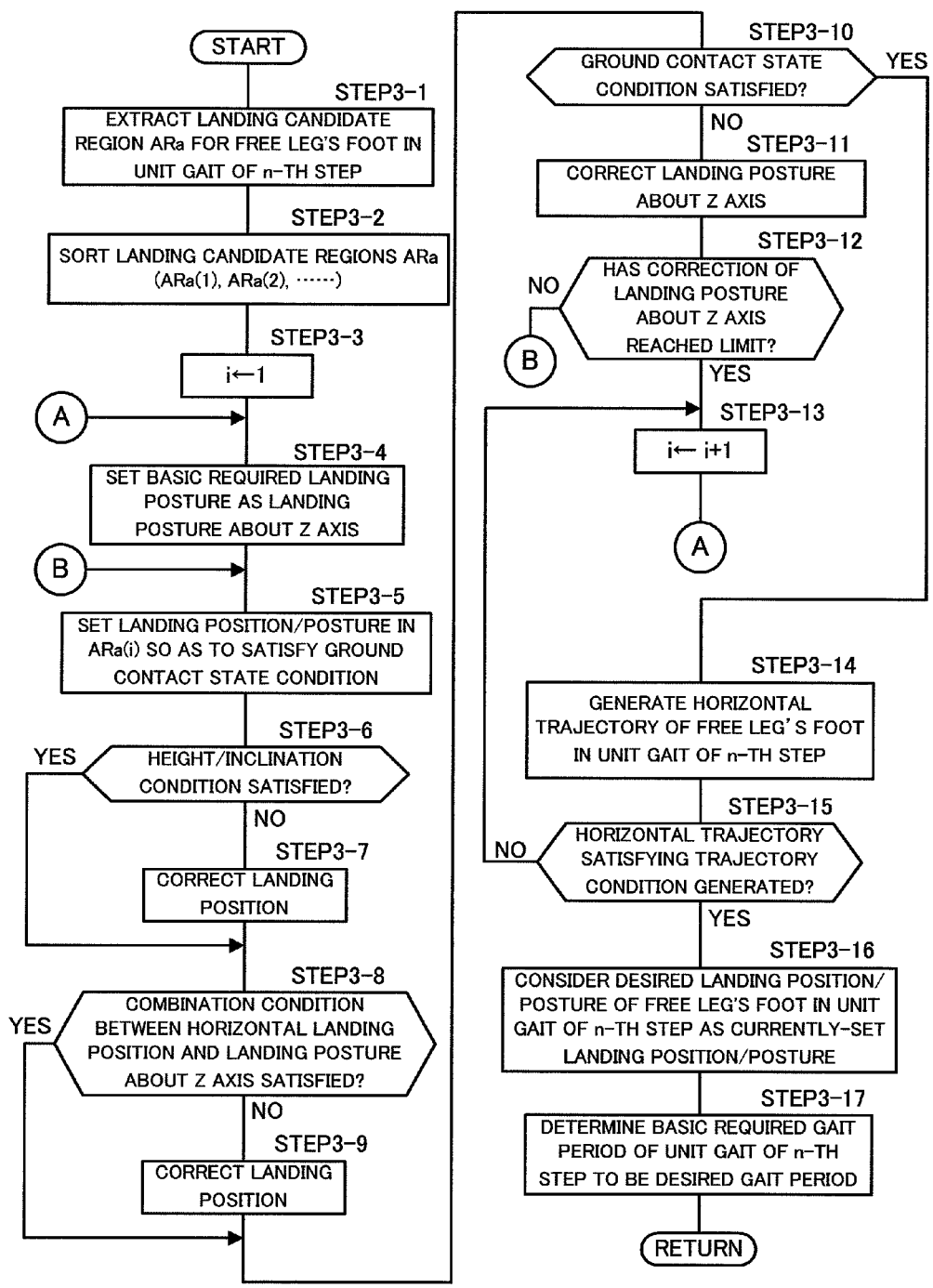
FIG. 5 is a flowchart illustrating the details of the process of STEP 3 of FIG. 4.

The process of the above STEP 3 is performed as illustrated in the flowchart of FIG. 5. Describing hereinafter, the gait generator 22, first, performs the process of STEP 3-1. In STEP 3-1, the gait generator 22 extracts a landing candidate region ARa, which is a candidate for a region on which the free leg's foot 4swg is to land on the ground in the unit gait of the n-th step, from the plurality of local regions AR whose floor surface information has already been acquired by the floor surface information acquisition portion 21.

Here, in this embodiment, when determining the desired landing position/posture of the free leg's foot 4swg in each unit gait, the desired landing position/posture of the free leg's foot 4swg is determined within one local region AR selected so as to satisfy required conditions out of the plurality of local regions AR. The landing candidate region ARa extracted in STEP 3-1 is a local region AR which can be an object of the above selection.

The landing candidate region ARa is specifically extracted as described below. To be specific, the gait generator 22 extracts the local regions AR each having a central point Ca within a landing limit region Ra, which is set as indicated by a two-dot chain line in FIG. 6, from local regions AR as landing candidate regions ARa.

In this embodiment, the landing limit region Ra is a region having an elliptical shape when viewed in the Z-axis direction. The arrangement position is determined so that the horizontal position (the position in the X-axis direction and in the Y-axis direction) of the central point Pa of the landing limit region Ra viewed in the robot coordinate system corresponding to the supporting leg's foot 4sup in the unit gait of the n-th step is a predetermined position. For example, the position of the point, where the distances in the X-axis direction and in the Y-axis direction from the origin in the robot coordinate system corresponding to the supporting leg's foot 4sup in the unit gait of the n-th step are predetermined given values, is considered to be the horizontal position of the central point Pa of the landing limit region Ra.

In this case, if the supporting leg's foot 4*sup* in the unit gait of the n-th step is the foot 4 of the right leg 3 of the robot 1, the central point Pa of the landing limit region Ra is set to the left of the supporting leg's foot 4*sup*, and if the supporting leg's foot 4*sup* is the foot 4 of the left leg 3, the central point Pa of the landing limit region Ra is set to the right of the supporting leg's foot 4*sup*.

Moreover, the size of the landing limit region Ra (more specifically, the diameter of the landing limit region Ra in the X-axis direction and in the Y-axis direction in the robot coordinate system corresponding to the supporting leg's foot 4*sup* in the unit gait of the n-th step) is assumed to be a predetermined size. The predetermined size is set so that the displacement amount of each joint of the legs 3 and 3 is able to be controlled to be within the mechanical movable range of the joint in the case where the free leg's foot 4*swg* is landed on the ground within an arbitrary local region ARa having a central point Ca within the landing limit region Ra.

In STEP 3-1, a local region AR having a central point Ca within the landing limit region Ra set as described above is extracted as a landing candidate region ARa from a plurality of local regions AR whose floor surface information has been acquired by the floor surface information acquisition portion 21. In this case, however, a local region AR with no ground-contactable surface (a local region AR with the ground-contactability indication flag set to OFF) and a local region AR where an interference occurs between the free leg's foot 4*swg* in the unit gait of the n-th step and the supporting leg's foot 4*sup* (a local region AR overlapping the supporting leg's foot 4*sup*) are excluded from the landing candidate regions ARa.

Figure 6:
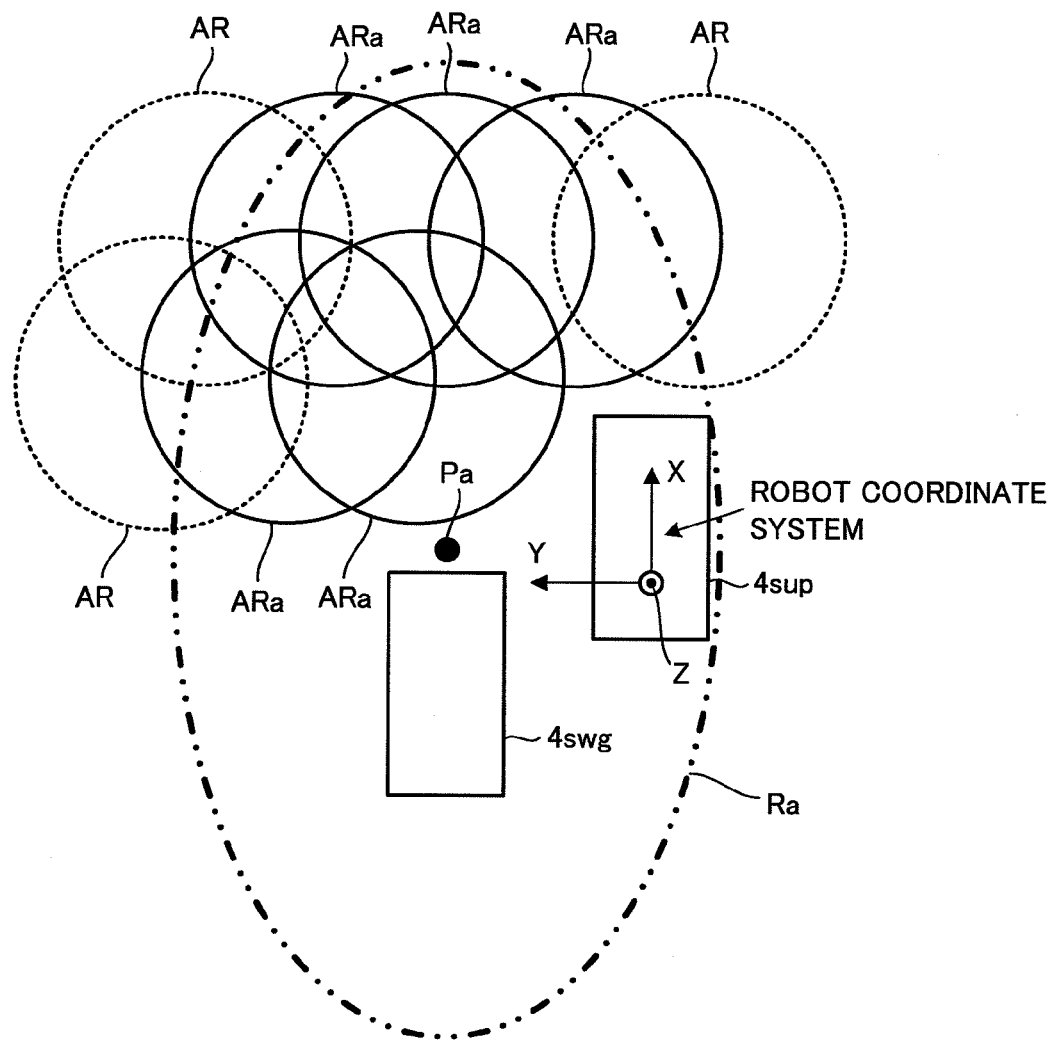
FIG. 6 is a diagram for describing the process of STEP 3-1 of FIG. 5.

By this extraction processing, local regions Ar such as, for example, the local regions AR each indicated by a solid line in FIG. 6 are extracted as landing candidate regions AR, while local regions AR such as, for example, the local regions AR each indicated by a broken line are excluded from the landing candidate regions ARa. In FIG. 6, some local regions AR are typically illustrated, out of the plurality of local regions AR whose floor surface information has been acquired by the floor surface information acquisition portion 21.

Subsequently, the gait generator 22 performs the process of STEP 3-2. In STEP 3-2, the gait generator 22 sorts the extracted landing candidate regions ARa so as to be ranked in ascending order of the horizontal distance between the central point Ca of the landing candidate region ARa and the representative point of the free leg's foot 4*swg* in the basic required landing position/posture of the free leg's foot 4*swg* in the unit gait of the n-th step.

Hereinafter, the landing candidate regions ARa sorted in this manner will be denoted by ARa(i) (i=1, 2, - - - ). In this case, the shorter the horizontal distance between the central point Ca of the landing candidate region ARa(i) and the representative point of the free leg's foot 4*swg* in the basic required landing position/posture of the free leg's foot 4*swg* in the unit gait of the n-th step is, the smaller the value of index i (the rank of ARa(i) is.

Subsequently, the gait generator 22 initializes the value i of the rank of the focused landing candidate region ARa(i) to "1" in STEP 3-3 and then performs the processes of STEPS 3-4 to 3-12. The processes of STEPS 3-4 to 3-12 intend to validate the possibility of setting the desired landing position/posture of the free leg's foot 4*swg* satisfying the required conditions within the focused landing candidate region ARa(i) in an exploratory manner.

Specifically, in STEP 3-4, the gait generator 22 provisionally sets the basic required landing posture (the posture about the Z axis in the basic required landing position/posture) of the free leg's foot 4*swg* of the n-th step determined in the above STEP 1, as a landing posture about the Z axis (a default landing posture) of the free leg's foot 4*swg* in the case of landing the free leg's foot 4*swg* in the unit gait of the n-th step on the ground within the focused landing candidate region ARa(i).

Subsequently, in STEP 3-5, the gait generator 22 sets the landing position/posture of the free leg's foot 4*swg* in the unit gait of the n-th step in the focused landing candidate region ARa(i) so as to satisfy a given ground contact state condition.

The ground contact state condition intends to prevent the area of the ground contact surface of the free leg's foot 4*swg* in the landing position/posture to be set from being excessively small or to prevent the posture about the Z axis of the free leg's foot 4*swg* from being an inappropriate posture relative to the boundary line Le of the ground-contactable surface of the landing candidate region ARa(i).

Specifically, the ground contact state condition includes, for example, a condition that the area of a ground contact surface (a contact surface with the ground-contactable surface) of the free leg's foot 4*swg* in the landing position/posture to be set is equal to or greater than a given value (hereinafter, referred to as "first ground contact state condition") and a condition that an angle (an angle about the Z axis) formed between the horizontal axis in the back-and-forth direction of the free leg's foot 4*swg* in the landing position/posture to be set and the boundary line Le of the ground-contactable surface of the focused landing candidate region ARa(i) is within a given range (hereinafter, referred to as "second ground contact state condition").

The given range is determined according to the motion pattern or the like of the leg 3 in the desired gait to be generated. For example, in the case of generating a desired gait for walking or running of the robot 1, the given range is assumed to be a range around 90°. In addition, in the case of generating a desired gait for moving sideways of the robot 1, the given range is assumed to be a range around 0°.

In addition, the given range may be set to a range around an angle formed between the horizontal axis in the back-and-forth direction of the free leg's foot 4*swg* in the basic required landing position/posture and the boundary line Le of the ground-contactable surface of the focused landing candidate region ARa(i).

Furthermore, to be more precise, the process of STEP 3-5 is performed as described below. Specifically, the gait generator 22, first, provisionally sets the landing position/posture of the free leg's foot 4*swg* so as to land the free leg's foot 4*swg* on the ground within the focused landing candidate region ARa(i), on the assumption that the landing posture about the Z axis in the landing position of the free leg's foot 4*swg* in the unit gait of the n-th step coincides with the basic required landing posture.

In this case, the landing position/posture of the free leg's foot 4*swg* in the focused landing candidate region ARa(i) is provisionally set so that the landing position in the horizontal direction (the X-axis direction and the Y-axis direction) of the free leg's foot 4*swg* in the provisionally-set landing position/posture is the position which is close to the horizontal landing position of the free leg's foot 4*swg* in the basic required landing position/posture as much as possible (for example, the horizontal distance between the former landing position and the latter landing position is the shortest).

In addition, the landing posture about the X axis and about the Y axis of the free leg's foot 4*swg* and the landing position in the Z-axis direction are provisionally set so that the bottom surface of the free leg's foot 4*swg* lands on the ground-contactable surface of the focused landing candidate region ARa(i) in posture in parallel with the ground-contactable surface.

In the case where the focused landing candidate region ARa(i) is a region where the entire thereof is a ground-contactable surface, the landing position/posture of the free leg's foot $4swg$, which is provisionally set as described above, is assumed to satisfy the ground contact state condition (both of the first ground contact state condition and the second ground contact state condition). Therefore, in the case where the focused landing candidate region ARa(i) is a region where the entire thereof is a ground-contactable surface, the gait generator 22 considers the landing position/posture of the free leg's foot $4swg$, which is provisionally set as described above, to be a target landing position/posture satisfying the ground contact state condition and terminates the process of STEP 3-5.

Meanwhile, in the case where the ground-contactable surface of the focused landing candidate region ARa(i) has a boundary line Le, the gait generator 22 provisionally sets the landing position/posture of the free leg's foot $4swg$ as described above and then decides whether the landing position/posture satisfies the first ground contact state condition and the second ground contact state condition.

Figure 7A:
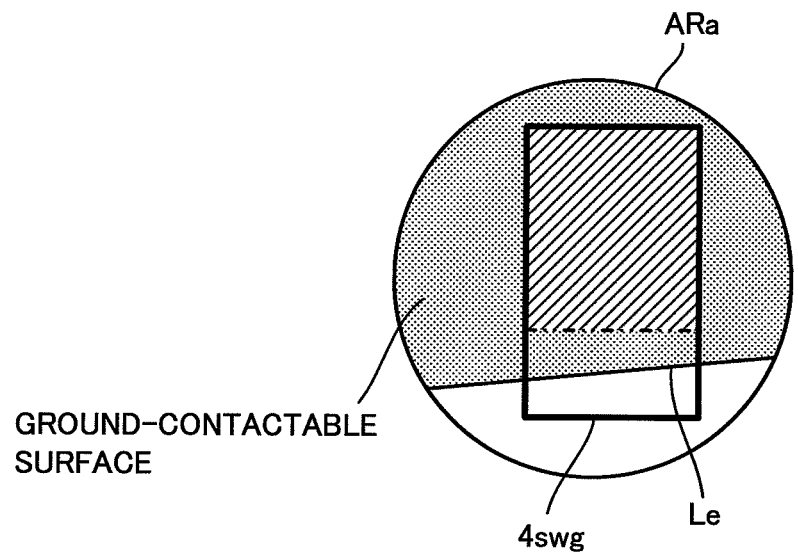
FIGS. 7A and 7B are diagrams for describing a ground contact state condition in the process of STEP 3-5 of FIG. 5.

In this case, the landing position/posture of the free leg's foot $4swg$ satisfying both of the first ground contact state condition and the second ground contact state condition is, for example, the landing position/posture as illustrated in FIG. 7A.

Figure 7B:
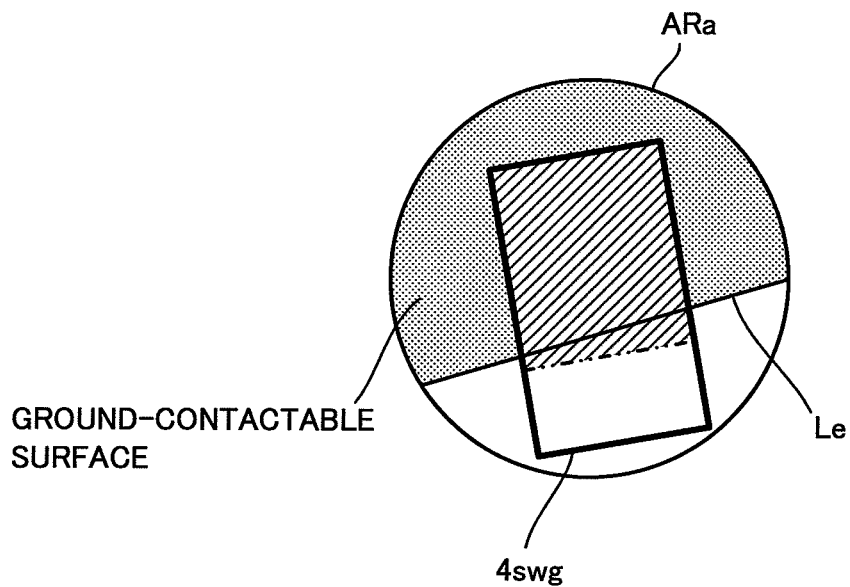

In addition, the landing position/posture of the free leg's foot $4swg$ not satisfying one of the first ground contact state condition and the second ground contact state condition such as, for example, the first ground contact state condition is, for example, the landing position/posture as illustrated in FIG. 7B.

The shaded areas in FIGS. 7A and 7B represent ground contact areas necessary to satisfy the first ground contact state condition.

In addition, in the case where the provisionally-set landing position/posture satisfies both of the first ground contact state condition and the second ground contact state condition, the gait generator 22 assumes the landing position/posture to be a target landing position/posture which satisfies the ground contact state condition and terminates the process of STEP 3-5.

Moreover, in the case where the provisionally-set landing position/posture does not satisfy the first ground contact state condition or the second ground contact state condition, the gait generator 22 corrects one or both of the horizontal landing position and the landing posture about the Z axis of the free leg's foot $4swg$ so as to satisfy the first ground contact state condition and the second ground contact state condition.

For example, in the case where the landing posture about the Z axis of the free leg's foot $4swg$ does not satisfy the second ground contact state condition, the gait generator 22 corrects the landing posture about the Z axis of the free leg's foot $4swg$ so as to be a posture similar to the landing posture about the Z axis in the basic required landing position/posture as much as possible (for example, the most similar posture) within the range of the landing posture about the Z axis which satisfies the second ground contact state condition.

Moreover, in the case of not satisfying the first ground contact state condition (including a case where the first ground contact state condition is not satisfied as a result of the correction of the landing posture about the Z axis of the free leg's foot $4swg$), the gait generator 22 corrects the horizontal landing position of the free leg's foot $4swg$ (the position or positions in one or both of the X-axis direction and the Y-axis direction) so as to be a position close to the horizontal landing position in the basic required landing position/posture as much as possible (for example, the closest position) within the range of the horizontal landing position which satisfies the first ground contact state condition.

As described hereinabove, the landing position/posture of the free leg's foot $4swg$ satisfying the ground contact state condition is set within the focused landing candidate region ARa(i) and the process of STEP 3-5 is completed.

Although not described in FIG. 5, the gait generator 22 performs the processing from STEP 3-13 described later in the case where both of the first ground contact state condition and the second ground contact state condition are not satisfied even after correcting one or both of the horizontal landing position and the landing posture about the Z axis of the free leg's foot $4swg$.

Subsequently, the gait generator 22 performs the decision process of STEP 3-6. In this STEP 3-6, the gait generator 22 decides whether the landing position/posture of the free leg's foot $4swg$ set in STEP 3-5 satisfies a given height/inclination condition.

The aforementioned height/inclination condition intends to prevent the displacement amount of each joint of each leg 3 from exceeding the acceptable limit by limiting the acceptable range of the horizontal landing position of the free leg's foot $4swg$ (consequently, the step length in the unit gait of the n-th step) according to the relative height of the landing position of the free leg's foot $4swg$ relative to the supporting leg's foot $4sup$ in the unit gait of the n-th step (more specifically, the landing position in the Z-axis direction of the free leg's foot $4swg$ viewed in the robot coordinate system corresponding to the supporting leg's foot $4sup$ in the unit gait of the n-th step) and according to a relative degree of inclination of the landing posture (the landing posture about the horizontal axis) of the free leg's foot $4swg$ relative to the supporting leg's foot $4sup$ in the unit gait of the n-th step (more specifically, the landing posture about the X axis and about the Y axis of the free leg's foot $4swg$ viewed in the robot coordinate system corresponding to the supporting leg's foot $4sup$ in the unit gait of the n-th step).

The height/inclination condition is composed of a height condition related to the relative height of the landing position of the free leg's foot $4swg$ relative to the supporting leg's foot $4sup$ and an inclination condition related to the relative degree of inclination of the landing posture of the free leg's foot $4swg$ relative to the supporting leg's foot $4sup$.

In the aforementioned height condition, the positions in the X-axis direction and in the Y-axis direction of the free leg's foot $4swg$ viewed in the robot coordinate system corresponding to the supporting leg's foot $4sup$ in the unit gait of the n-th step need to be positions within a given acceptable range set according to the aforementioned relative height.

Moreover, in the aforementioned inclination condition, the positions in the X-axis direction and in the Y-axis direction of the free leg's foot $4swg$ viewed in the robot coordinate system corresponding to the supporting leg's foot $4sup$ in the unit gait of the n-th step need to be positions within a given acceptable range set according to the aforementioned relative degree of inclination.

In STEP 3-6, the gait generator 22 decides whether the set landing position/posture of the free leg's foot $4swg$ satisfies the height/inclination condition by deciding whether the horizontal landing position in the landing position/posture of the free leg's foot $4swg$ in the unit gait of the n-th step set in STEP 3-5 is within the acceptable range of the height condition and the acceptable range of the inclination condition.

In this case, the acceptable range of the height condition is set according to the relative height of the free leg's foot $4swg$, and the acceptable range of the inclination condition is set according to the relative degree of inclination of the free leg's foot $4swg$. The acceptable ranges of the height condition and the inclination condition are determined in advance according to the relative height and the relative degree of inclination of the free leg's foot $4swg$ so that the free leg's foot $4swg$ is able to be moved up to the landing position within the movable range of the joint of each leg 3 as long as the landing positions in the X-axis direction and in the Y-axis direction of the free leg's foot $4swg$ are within the acceptable range.

Further, if the decision result of STEP 3-6 is negative (if the height/inclination condition is not satisfied), the gait generator 22 performs the processing of correcting the landing position (the horizontal landing position) of the free leg's foot $4swg$ in the unit gait of the n-th step to the position satisfying the height/inclination condition within the focused landing candidate region ARa in STEP 3-7. In this case, the landing position of the free leg's foot $4swg$ is corrected so that the correction amount (the horizontal displacement amount) from the landing position before the correction decreases as much as possible (for example, decreases to the smallest).

Although not described in FIG. 5, in the case where the height/inclination condition is not satisfied even after the horizontal landing position of the free leg's foot $4swg$ is corrected in STEP 3-7, the gait generator 22 performs the processing from STEP 3-13 described later.

If the decision result of STEP 3-6 is affirmative (if the height/inclination condition is satisfied) or after performing the process of STEP 3-7, the gait generator 22 performs the decision process of STEP 3-8, next.

In this STEP 3-8, the gait generator 22 decides whether the currently-set landing position/posture of the free leg's foot $4swg$ satisfies a given combination condition between the horizontal landing position of the free leg's foot $4swg$ and the landing posture about the Z axis thereof.

The aforementioned combination condition intends to prevent the displacement amount of each joint of each leg 3 from exceeding the acceptable limit by limiting the acceptable range of the horizontal landing position of the free leg's foot $4swg$ (the acceptable range on the XY-coordinate plane) according to the landing posture about the Z axis of the free leg's foot $4swg$ in the unit gait of the n-th step (the landing posture about the Z axis viewed in the robot coordinate system corresponding to the supporting leg's foot $4sup$ in the unit gait of the n-th step).

In this case, the acceptable range of the horizontal landing position of the free leg's foot $4swg$ is set in advance as map data formed by mapping with the landing posture about the Z axis of the free leg's foot $4swg$ as an input variable.

Then, in the decision process of STEP 3-8, the gait generator 22 finds the acceptable range of the horizontal landing position of the free leg's foot $4swg$ on the basis of the map data from the currently-set landing posture about the Z axis of the free leg's foot $4swg$ (the landing posture set in STEP 3-5).

Furthermore, the gait generator 22 decides whether the currently-set landing position/posture of the free leg's foot $4swg$ satisfies the above combination condition by deciding whether the currently-set horizontal landing position of the free leg's foot $4swg$ is within the acceptable range.

Subsequently, if the decision result of STEP 3-8 is negative (if the combination condition is not satisfied), the gait generator 22 performs the processing of correcting the landing position (the horizontal landing position) of the free leg's foot $4swg$ in the unit gait of the n-th step to a position satisfying both of the height/inclination condition and the combination condition within the focused landing candidate region ARa in STEP 3-9. In this case, the landing position of the free leg's foot $4swg$ is corrected so that the correction amount (the horizontal displacement amount) from the landing position before the correction decreases as much as possible (for example, the smallest).

Although not described in FIG. 5, in the case where both of the height/inclination condition and the combination condition are not satisfied even after the horizontal landing position of the free leg's foot $4swg$ is corrected in STEP 3-9, the gait generator 22 performs the processing from STEP 3-13 described later.

If the decision result of STEP 3-8 is affirmative (if both of the height/inclination condition and the combination condition are satisfied) or after performing the process of STEP 3-9, the gait generator 22 performs the decision process of STEP 3-10, next.

Here, if the landing position of the free leg's foot $4swg$ in the unit gait of the n-th step is corrected in the above STEP 3-7 or 3-9, the ground contact state condition might be unsatisfied.

Therefore, in STEP 3-10, the gait generator 22 decides whether the currently-set landing position/posture of the free leg's foot $4swg$ satisfies the ground contact state condition again.

If the decision result of STEP 3-10 is negative, the gait generator 22 performs the processing of correcting the landing posture about the Z axis of the free leg's foot $4swg$ from the currently-set posture in STEP 3-11, next.

In this correction processing, the gait generator 22 corrects the landing posture about the Z axis of the free leg's foot $4swg$ from the currently-set posture by a given amount within a range of satisfying the second ground contact state condition.

Subsequently, in STEP 3-12, the gait generator 22 decides whether the correction of the landing posture about the Z axis of the free leg's foot $4swg$ reaches a limit. Here, the fact that the correction of the landing posture about the Z axis of the free leg's foot $4swg$ has reached the limit means that, if the landing posture about the Z axis of the free leg's foot $4swg$ is corrected from the currently-set posture by the given amount, the second ground contact state condition cannot be satisfied any more, in other words, the landing posture about the Z axis of the free leg's foot $4swg$ cannot be set to a new posture within the range of satisfying the second ground contact state condition.

Furthermore, if the decision result of STEP 3-12 is negative, the gait generator 22 performs the processing from STEP 3-5 again. The second ground contact state condition is satisfied in the process of STEP 3-5 in this case, and therefore the horizontal landing position of the free leg's foot $4swg$ is set so that the first ground contact state condition is satisfied.

Moreover, if the decision result of STEP 3-12 is affirmative, it is impossible to set the landing position/posture of the free leg's foot $4swg$ satisfying all of the ground contact state condition, the height/inclination condition, and the combination condition within the current focused landing candidate region ARa. Therefore, in this case, the gait generator 22 sets the value i of the rank of the focused landing candidate region ARa(i) to a value increased by one in STEP 3-13 and then performs the processes of STEPS 3-4 to 3-12 again.

As described hereinabove, the landing position/posture of the free leg's foot $4swg$ satisfying all of the ground contact state condition, the height/inclination condition, and the combination condition is finally set within a landing candidate region ARa(i). In addition, in this case, the decision result of STEP 3-10 is affirmative.

In this case, the gait generator 22 performs the process of STEP 3-14 subsequently to the decision process of STEP 3-10. In this STEP 3-14, the gait generator 22 determines a horizontal trajectory (a trajectory viewed in the vertical axis direction) of the free leg's foot 4swg in the unit gait of the n-th step so as to satisfy a given trajectory condition.

The given trajectory condition includes, for example, a first trajectory condition that the free leg's foot 4swg in the unit gait of the n-th step does not interfere with the leg 3 as a supporting leg in the unit gait of the n-th step, a second trajectory condition that the maximum height (specifically, the maximum height in the Z-axis direction viewed in the robot coordinate system corresponding to the supporting leg's foot 4sup in the unit gait of the n-th step) of the ground-contactable surface or the top surface of a bump in each local region ARa (a local region ARa intersecting with the horizontal trajectory viewed in the Z-axis direction) arranged directly below the horizontal trajectory of the free leg's foot 4swg is equal to or lower than a given value, and a third trajectory condition that there is no local region AR whose floor surface information is unknown (not set) directly below the horizontal trajectory of the free leg's foot 4swg.

With respect to the third trajectory condition, in the case where the size of a region overlapping a neighboring local region AR, among the local regions AR whose floor surface information based on the measured data of the floor surface recognition sensor 12 is unknown, is within a given range (for example, if the region is equal to or larger than three fourths of the area of the local region AR), the floor surface information of the local region AR whose floor surface information is unknown may be interpolated by using the floor surface information of the neighboring local region AR. For example, the unknown floor surface information may be interpolated by expanding the ground-contactable surface of the neighboring local region AR with the center having the shortest distance from the center of the local region AR whose floor surface information is unknown. Also in the case where there is a floor surface region where the local region AR is not virtually arranged, the interpolation may be performed in the same manner.

Moreover, in this embodiment, the gait generator 22 is able to generate a plurality of types of horizontal trajectories satisfying the first trajectory condition (a plurality of types of horizontal trajectories which are different from each other in parameter defining a shape pattern such as a change pattern in curvature of the trajectory) up to the landing position set from the ground contact position before leaving the ground of the free leg's foot 4swg in the unit gait of the n-th step according to a given algorithm (arithmetic processing). Basically, as illustrated in the example indicated by a thick arrowed line in FIG. 8, the horizontal trajectories each are convex toward the side departing from the supporting leg in order to avoid the interference between the free leg's foot 4swg and the supporting leg (the leg 3 having the supporting leg's foot 4sup).

Further, in STEP 3-14, the gait generator 22 sequentially generates the respective types of horizontal trajectories (trajectories satisfying the first trajectory condition) from the ground contact position before leaving the ground of the free leg's foot 4swg in the unit gait of the n-th step to the landing position of the free leg's foot 4swg finally set by the processes of the above STEPS 3-1 to 3-13 in a given order.

In this case, as the ground contact position before leaving the ground of the free leg's foot 4swg in the unit gait of the n-th step, for example, the landing position set as the desired landing position of the free leg's foot 4swg in the unit gait previous to the unit gait of the n-th step is used.

Furthermore, the gait generator 22 decides whether the horizontal trajectory satisfies the second trajectory condition and the third trajectory condition with reference to the floor surface information acquired by the floor surface information acquisition portion 21 every time generating each type of horizontal trajectory. If the decision result is affirmative, the horizontal trajectory is obtained as a trajectory satisfying the given trajectory condition (the first to third trajectory conditions).

Subsequently, the gait generator 22 decides whether the horizontal trajectory satisfying the trajectory condition is generated in STEP 3-15.

If the decision result is negative, in other words, all types of horizontal trajectories generated in STEP 3-14 do not satisfy the second trajectory condition or the third trajectory condition, the gait generator 22 determines that the current focused landing candidate region ARa(i) is inappropriate for satisfying the given trajectory condition, and then performs the process of STEP 3-13 (the process of changing the focused landing candidate region ARa(i)) and thereafter performs the processing from STEP 3-4 again, similarly to the case where the decision result of STEP 3-12 is affirmative.

Moreover, if the decision result of STEP 3-15 is affirmative, in other words, if the horizontal trajectory satisfying the first to third trajectory conditions is generated in STEP 3-14, the gait generator 22 performs the process of STEP 3-16, next.

In STEP 3-16, the gait generator 22 considers the desired landing position/posture of the free leg's foot 4swg in the unit gait of the n-th step as a currently-set landing position/posture, in other words, a landing position/posture finally set by the processes of STEPS 3-1 to 3-15.

Thereby, the desired landing position/posture of the free leg's foot 4swg in the unit gait of the n-th step is determined so as to satisfy the ground contact state condition, the height/inclination condition, the combination condition, and the trajectory condition within a certain landing candidate region ARa(i).

Furthermore, the gait generator 22 determines the desired gait period of the unit gait of the n-th step in STEP 3-17. In this case, the basic required gait period of the unit gait of the n-th step set in STEP 1 is determined as a desired gait period of the unit gait of the n-th step directly.

This completes the detailed description of the processing performed by the gait generator 22 in STEP 3.

The following describes the details of the processing performed by the gait generator 22 in STEP 4. The process of STEP 4 in FIG. 4 falls into the general classification of: processing of determining a foot position/posture trajectory parameter defining the desired foot position/posture trajectory of the supporting leg's foot 4sup in the unit gait of the n-th step; and a processing of determining a foot position/posture trajectory parameter defining the desired foot position/posture trajectory of the free leg's foot 4swg in the unit gait.

The processing of determining a foot position/posture trajectory parameter defining the desired foot position/posture trajectory of the supporting leg's foot 4sup is performed, for example, as described below. Specifically, the desired foot posture of the supporting leg's foot 4sup at the beginning (the starting point) of the unit gait of the n-th step is assumed to be the posture of the free leg's foot 4swg at the end (the end point) of the unit gait previous to the unit gait concerned.

Furthermore, the desired foot posture trajectory of the supporting leg's foot 4sup is assumed to be a trajectory which continuously varies (including the case where a constant posture is made for a certain period) in a given pattern determined in advance from the desired posture at the beginning of the unit gait.

Moreover, the desired foot position of the supporting leg's foot 4sup at the beginning (the starting point) of the unit gait is assumed to be the position of the free leg's foot 4swg at the end (the end point) of the unit gait previous to the unit gait concerned.

Furthermore, the desired foot position trajectory of the supporting leg's foot 4sup is assumed to be a foot position trajectory defined by varying the posture of the supporting leg's foot 4sup according to the desired posture trajectory in such a way as to prevent the supporting leg's foot 4sup from sliding against the floor surface from the desired position/posture at the beginning of the unit gait.

Then, a parameter defining the desired foot position/posture trajectory of the supporting leg's foot 4sup determined as described above is determined as a foot position/posture trajectory parameter of the supporting leg's foot 4sup.

Figure 9:
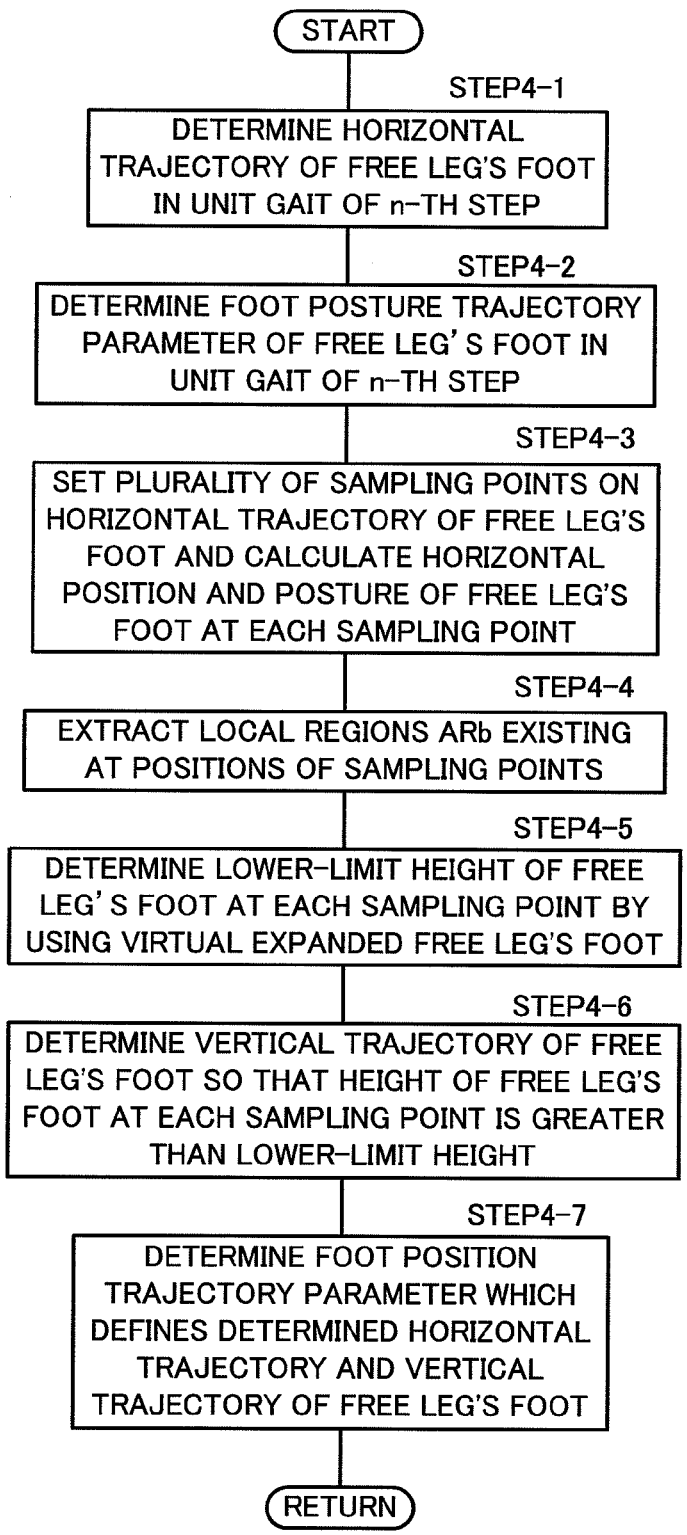
FIG. 9 is a flowchart illustrating the details of the process of STEP 4 of FIG. 4.

Meanwhile, processing of determining the foot position/posture trajectory parameter defining the desired foot position/posture trajectory of the free leg's foot 4swg is performed, for example, as illustrated in the flowchart of FIG. 9. Hereinafter describing, the gait generator 22, first, performs the process of STEP 4-1.

In this STEP 4-1, the gait generator 22 determines the horizontal trajectory of the free leg's foot 4swg in the unit gait of the n-th step. In this case, the horizontal trajectory generated so as to satisfy the trajectory condition in STEP 3-14 is directly determined as the horizontal trajectory of the free leg's foot 4swg in the unit gait of the n-th step.

Subsequently, the gait generator 22 performs processing of determining the foot posture trajectory parameter defining the desired foot posture trajectory among the foot position/posture trajectories of the free leg's foot 4swg in the unit gait of the n-th step in STEP 4-2.

In this case, the desired foot posture of the free leg's foot 4swg at the beginning of the unit gait of the n-th step is assumed to be a foot posture of the supporting leg's foot 4sup at the end of the unit gait previous to the unit gait concerned.

Furthermore, the desired foot posture trajectory of the free leg's foot 4swg is assumed to be a trajectory which continuously varies (including a case where a period of a constant posture exists) in a given pattern determined in advance toward the desired landing posture of the free leg's foot 4swg from the desired posture at the beginning of the unit gait. In addition, the parameter defining the foot posture trajectory as described above is determined as the foot posture trajectory parameter of the free leg's foot 4swg.

Subsequently, the gait generator 22 performs processing of determining a vertical trajectory (a trajectory in the Z-axis direction) of the free leg's foot 4swg in the unit gait of the n-th step in STEPS 4-3 to 4-7.

In STEP 4-3, the gait generator 22 sets a plurality of sampling points on the horizontal trajectory of the free leg's foot 4swg determined in STEP 4-1 and calculates the horizontal position of the free leg's foot 4swg (more specifically, the position in the X-axis direction and in the Y-axis direction viewed in the robot coordinate system corresponding to the supporting leg's foot 4sup in the n-th step) and the posture of the free leg's foot 4swg (more specifically, the posture about each coordinate axis viewed in the robot coordinate system corresponding to the supporting leg's foot 4sup in the n-th step) at each sampling point.

Figure 8:
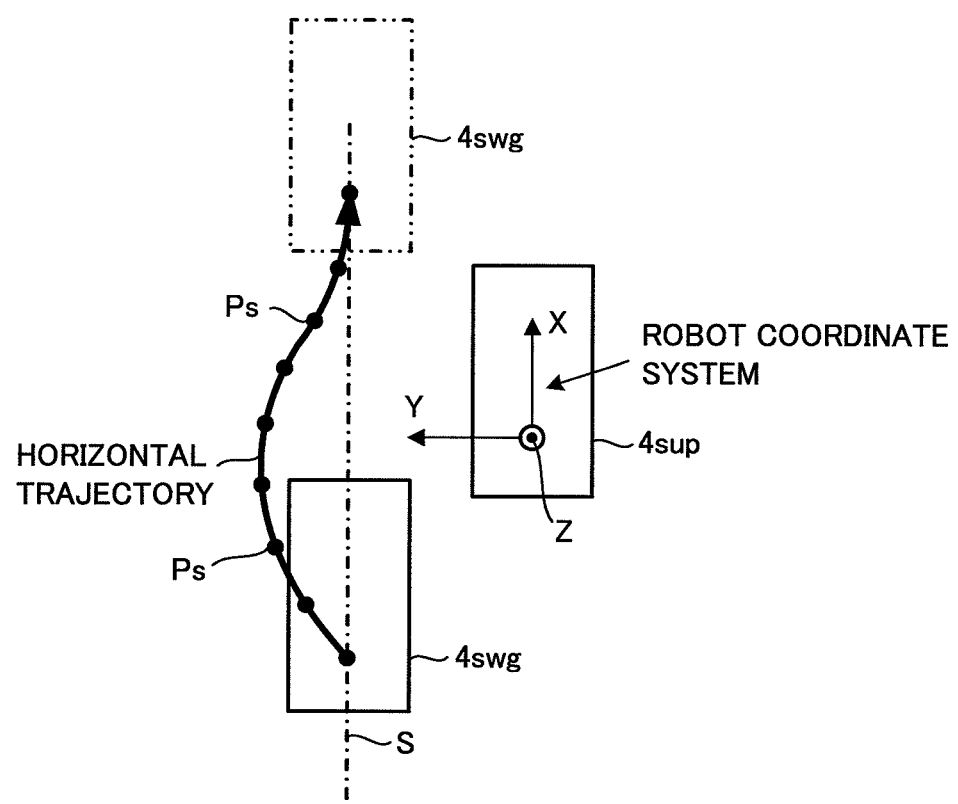
FIG. 8 is a diagram illustrating an example of a horizontal trajectory generated in the process of STEP 3-14 of FIG. 5.

In this case, the sampling points are set, for example, as aligned at regular intervals on the horizontal trajectory. For example, as illustrated in FIG. 8, a plurality of sampling points Ps are set on the horizontal trajectory. The sampling points set on the horizontal trajectory include the beginning point and the end point.

Then, a horizontal position at each sampling point is found as the horizontal position of the free leg's foot 4swg at the sampling point.

Moreover, the posture of the free leg's foot 4swg at the time of each sampling point is found on the basis of the foot posture trajectory of the free leg's foot 4swg determined in STEP 4-2 and is assumed to be a posture of the free leg's foot 4swg at the sampling point.

Subsequently in STEP 4-4, the gait generator 22 extracts local regions ARb existing at the positions of the sampling points on the horizontal trajectory of the free leg's foot 4swg among a plurality of local regions AR virtually arranged by the floor surface information acquisition portion 21 at the periphery of the robot 1.

Figure 10:
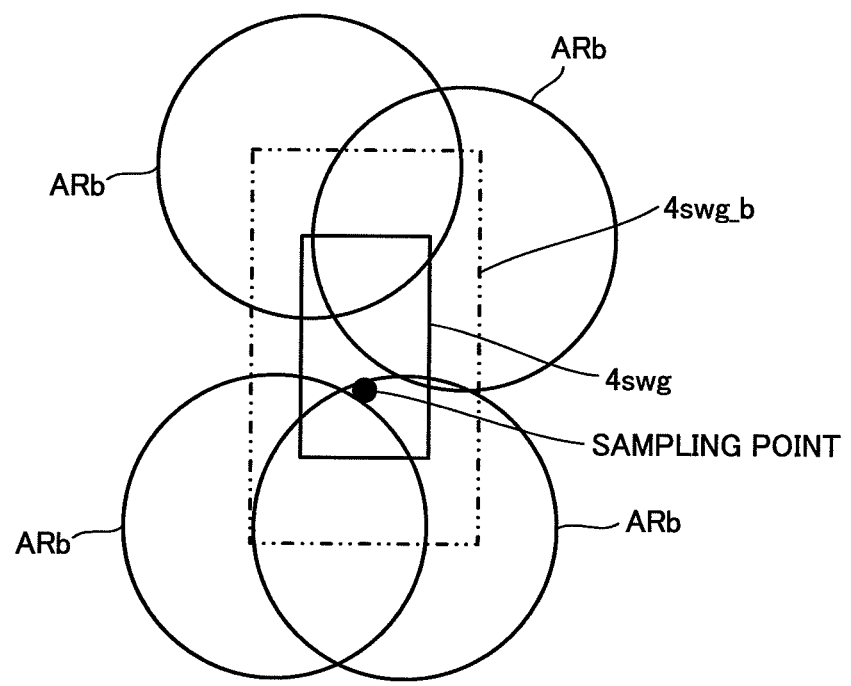
FIG. 10 is a diagram for describing the process of STEP 4-4 of FIG. 9.

Here, the local region ARb existing at the position of each sampling point is a local region AR having a part overlapping the free leg's foot 4swg when the free leg's foot 4swg at the position of the sampling point is viewed in the vertical direction (the Z-axis direction) as illustrated in FIG. 10.

In STEP 4-4, the local region ARb may be, for example, a local region AR having a part overlapping a foot 4swg_b with a size obtained by virtually expanding the free leg's foot 4swg as indicated by a two-dot chain line in FIG. 10 (hereinafter, the foot 4swg_b is referred to as virtual expanded free leg's foot 4swg_b in some cases). In this case, the position of the virtual expanded free leg's foot 4swg_b is assumed to coincide with the position of the free leg's foot 4swg. Moreover, the size of the virtual expanded free leg's foot 4swg_b is assumed to be, for example, a size obtained by expanding the free leg's foot 4swg by a predetermined given amount both in the length in the back-and-forth direction and in the width in the right-and-left direction.

Alternatively, the local region ARb may be, for example, a local region AR where an area of the part overlapping the free leg's foot 4swg or the virtual expanded free leg's foot 4swg_b is equal to or larger than a given value (a local region AR other than a local region where the area concerned is minute).

Subsequently, in STEP 4-5, the gait generator 22 determines the lower-limit height which is a lower limit of the height of the free leg's foot 4swg at a sampling point (the Z-axis direction position viewed in the robot coordinate system corresponding to the supporting leg's foot 4sup in the unit gait of the n-th step) by using the aforementioned virtual expanded free leg's foot 4swg_b. The sampling point for this processing is other than the sampling points of the beginning and the end of the horizontal trajectory of the free leg's foot 4swg among the sampling points set in STEP 4-3.

The lower-limit height is, more specifically, determined as a vertical position (a Z-axis direction position) at the maximum height where the virtual expanded free leg's foot 4swg_b comes in contact with the floor surface (the ground-contactable surface) of a local region ARb among the local regions ARb extracted in STEP 4-4 so as to correspond to respective sampling points, other than the sampling points of the beginning and the end of the horizontal trajectory of the free leg's foot 4swg, when the vertical position of the virtual expanded free leg's foot 4swg_b is varied with the horizontal position and posture of the virtual expanded free leg's foot 4swg_b at the sampling points, other than those of the beginning and the end of the horizontal trajectory of the free leg's foot 4swg, coinciding with the horizontal position of the free leg's foot 4*swg* at the sampling point calculated in STEP 4-3 and the desired posture of the free leg's foot 4*swg* at the position.

In other words, the lower-limit height at each sampling point is the minimum height (a vertical position) of the virtual expanded free leg's foot 4*swg_b* necessary to avoid a contact between the virtual expanded free leg's foot 4*swg_b* at the sampling point and the floor surface. In this case, the lower-limit height is a lower-limit height with respect to the virtual expanded free leg's foot 4*swg_b* having a size larger than the actual free leg's foot 4*swg*. Therefore, if the height of the actual free leg's foot 4*swg* is greater than the lower-limit height, it is possible to avoid the contact between the free leg's foot 4*swg* and the floor surface reliably even if some error occurs in the floor surface information of the local region ARb. For this reason, in this embodiment, the lower-limit height at each sampling point is determined by using the virtual expanded free leg's foot 4*swg_b*.

The lower-limit height at each sampling point is, more specifically, determined by, for example, a method as described below. In the description of this method, there is supposed a case of determining the lower-limit height at the m-th sampling point, which is an arbitrary sampling point other than the sampling points of the beginning and the end of the horizontal trajectory of the free leg's foot 4*swg* among the sampling points set in STEP 4-3.

In this embodiment, when determining the lower-limit height at the m-th sampling point, the gait generator 22, first, determines the lower-limit height for avoiding a contact of the virtual expanded free leg's foot 4*swg_b* with the floor surface of the local region ARb for each local region ARb extracted at the position of the m-th sampling point.

Figure 11A:
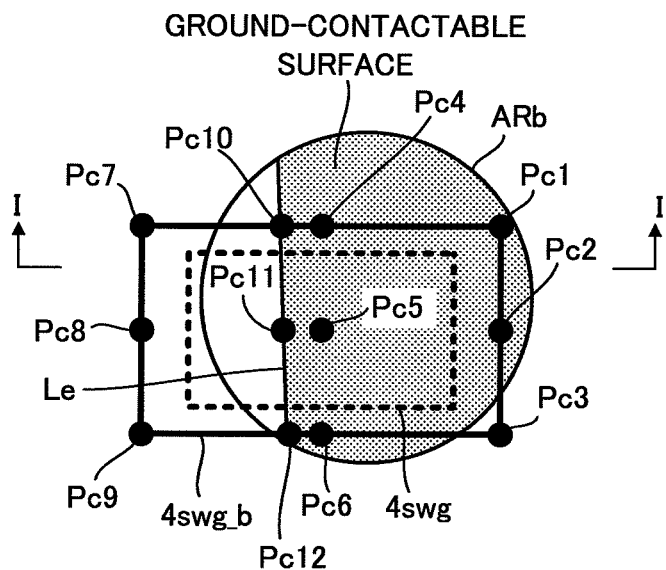
FIG. 11A is a diagram for describing the process of STEP 4-5 of FIG. 9.

In the above, when determining the lower-limit height corresponding to one arbitrary local region ARb extracted at the position of the m-th sampling point (hereinafter, referred to as "the mx-th local region ARb" in the description of this specification, for convenience), for example, as illustrated in FIG. 11A, points Pc1, Pc3, Pc7, and Pc9 at the respective corners of the virtual expanded free leg's foot 4*swg_b* at the position of the m-th sampling point, middle points Pc2, Pc4, Pc6, and Pc8 of the respective sides of the outer circumference, and the central point Pc5 in the right-and-left direction and in the back-and-forth direction are set as typical reference points of the virtual expanded free leg's foot 4*swg* b.

Furthermore, in the case where the ground-contactable surface of the mx-th local region ARb has an edge Le, as illustrated in FIG. 11A, points Pc10 and Pc12 at which the edge Le intersects with the circumference of the virtual expanded free leg's foot 4*swg_b*, and a midpoint Pc11 between these points Pc10 and Pc12 are added as additional reference points, when viewed in the vertical direction (the Z-axis direction).

Then, the gait generator 22 calculates the height of the virtual expanded free leg's foot 4*swg_b* in the case of arranging the virtual expanded free leg's foot 4*swg_b* so that each of the reference points (nine reference points other than Pc7 to Pc9 in the example illustrated in FIG. 11A located on the ground-contactable surface of the mx-th local region ARID, when viewed in the Z-axis direction among the reference points Pc1 to Pc9 (or Pa to Pc12), coincides with the point obtained by projecting the reference point in the vertical direction on the ground-contactable surface of the mx-th local region ARb, with the horizontal position and posture of the virtual expanded free leg's foot 4*swg_b* coinciding with the horizontal position and posture of the free leg's foot 4*swg* at the m-th sampling point calculated in STEP 4-2, respectively, for each reference point on the ground-contactable surface of the mx-th local region ARb.

Figure 11B:
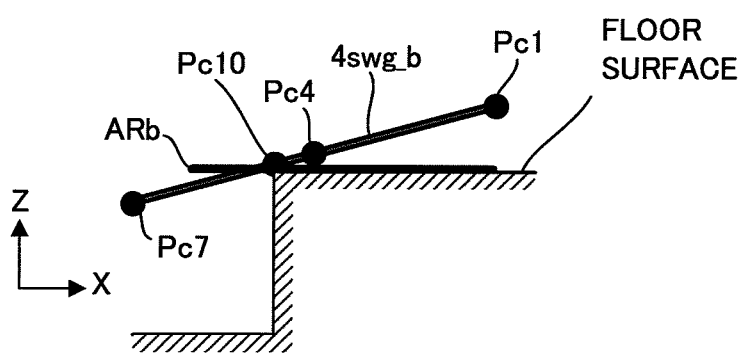
FIG. 11B is a sectional view taken along line I-I of FIG. 11A.

Additionally, the gait generator 22 finds the maximum height among the heights of the virtual expanded free leg's foot 4*swg_b* calculated as described above for the mx-th local region ARb, as the lower-limit height for the mx-th local region ARb. For example, in the case where the horizontal position and posture of the free leg's foot 4*swg* (=the horizontal position and posture of the virtual expanded free leg's foot 4*swg_b*) at the m-th sampling point is assumed to be the position and the posture as illustrated in FIG. 11B relative to the floor surface of the mx-th local region ARb in the example as illustrated in FIG. 11A, the height of the virtual expanded free leg's foot 4*swg_b* in the case where the reference point Pc10 of the virtual expanded free leg's foot 4*swg_b* coincides with a point on the edge Le of the ground-contactable surface in the mx-th local region is determined as a lower-limit height for the mx-th local region ARb.

In the example of this case, it is supposed that the ground-contactable surface of the mx-th local region ARb is a horizontal plane, the edge Le thereof inclines with respect to the lateral direction of the free leg's foot 4*swg*, and the posture of the free leg's foot 4*swg* is inclined only in the direction about the Y axis (in the pitch direction) with respect to the horizontal plane.

The gait generator 22 finds the lower-limit heights similarly to the above, also for respective local regions ARb other than the mx-th local region ARb extracted at the position of the m-th sampling point. The maximum height of the lower-limit heights corresponds to the maximum height where a contact is likely to occur between the floor surface of any local region ARb at the position of the m-th sampling point and the virtual expanded free leg's foot 4*swg_b*.

Therefore, the gait generator 22 determines the maximum height of the lower-limit heights found for each local region ARb extracted at the position of the m-th sampling point as a lower-limit height of the free leg's foot 4*swg* at the m-th sampling point.

Also with respect to other sampling points other than the m-th sampling point (except the sampling points at the beginning and the end of the horizontal trajectory), the lower-limit height of the free leg's foot 4*swg* is determined similarly to the above.

The method of determining the lower-limit height at each sampling point is not limited to the above, but may be determined in any other method. For example, spatial geometric calculation may be made instead of using the reference points, such as finding the maximum height of the virtual expanded free leg's foot 4*swg_b* (or the free leg's foot 4*swg*) which causes a contact between the virtual expanded free leg's foot 4*swg_b* (or the free leg's foot 4*swg*) and the floor surface of each local region ARb at the position of each sampling point and then determining the maximum height or a value obtained by adding the a small offset amount to the maximum height as the lower-limit height of the free leg's foot 4*swg* at the sampling point.

In addition, at the sampling points of the beginning and the end of the horizontal trajectory of the free leg's foot 4*swg*, in other words, at the sampling points in the positions where the free leg's foot 4*swg* comes in contact with the floor surface, the Z-axis direction positions at the desired landing position of the free leg's foot 4*swg* at the beginning and at the end of the unit gait of the n-th step are set as the lower-limit height at the sampling point of the beginning and as the lower-limit height at the sampling point of the end, respectively, in this embodiment, for convenience.

In this case, the Z-axis direction position at the desired landing position of the free leg's foot 4swg at the beginning of the unit gait of the n-th step (the lower-limit height at the sampling point of the beginning) is the Z-axis direction position at the end of a unit gait previous to the unit gait of the n-th step of the supporting leg's foot 4sup in the unit gait previous to the unit gait of the n-th step (the Z-axis direction position viewed in the robot coordinate system corresponding to the supporting leg's foot 4sup of the unit gait of the n-th step).

Moreover, the Z-axis direction position of the desired landing position of the free leg's foot 4swg at the end of the unit gait of the n-th step (the lower-limit height at the sampling point of the end) is a Z-axis direction position of the free leg's foot 4swg at the end of the unit gait (a Z-axis direction position viewed in the robot coordinate system corresponding to the supporting leg's foot 4sup in the unit gait of the n-th step) defined by the desired landing position/posture of the free leg's foot 4swg in the unit gait of the n-th step and the desired foot posture (which is determined in STEP 4-2) of the free leg's foot 4swg at the end of the unit gait.

In STEP 4-6 subsequent to STEP 4-5 described above, the gait generator 22 determines the vertical trajectory of the free leg's foot 4swg so that the heights of the free leg's foot 4swg at the respective sampling points (except the sampling points of the beginning and the end) on the horizontal trajectory of the free leg's foot 4swg are greater than the lower-limit heights determined in STEP 4-5.

Briefly describing the above processing, the gait generator 22 determines a point (a lower-limit offset point described later) of the height position (the vertical position) obtained by adding a given offset amount to the lower-limit height at each sampling point on the horizontal trajectory of the free leg's foot 4swg so as to correspond to each sampling point. Thereafter, the gait generator 22 determines a convex-shaped trajectory containing the determined points as a vertical trajectory of the free leg's foot 4swg.

In this manner, the processing of determining the vertical trajectory is specifically performed, for example, as described below. In the process of STEP 4-6, the gait generator 22 treats the spatial trajectory of the position (the position of a representative point) of the free leg's foot 4swg in the unit gait of the n-th step in a state where the spatial trajectory is projected on a vertical posture plane which passes through the beginning position and the end position of the unit gait and is orthogonal to the horizontal plane. The projection plane for performing the projection is, for example, a vertical posture plane including a straight line S illustrated in FIG. 8 in the case where the horizontal trajectory of the free leg's foot 4swg is, for example, a trajectory as illustrated in FIG. 8.

Therefore, the gait generator 22, first, calculates the position on the projection plane of a point (hereinafter, referred to as "lower-limit height projection point") obtained by projecting a point (hereinafter, referred to as "lower-limit height point") defined by the horizontal position of the free leg's foot 4swg at each sampling point and the lower-limit height at the sampling point on the projection plane in the normal line direction of the projection plane. In this case, the position of each lower-limit height projection point on the projection plane is determined by calculating the position of an intersection point between a straight line passing through each lower-limit height point and orthogonal to the projection plane and the projection plane as a position in a two-dimensional coordinate system set on the projection plane.

Figure 12A:
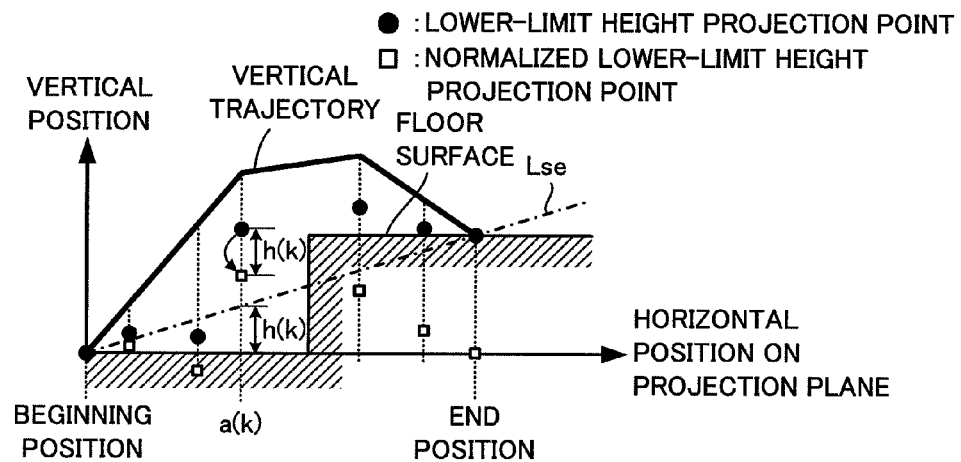
FIGS. 12A and 12B are diagrams for describing the process of STEP 4-6 of FIG. 9.

For example, a plurality of black circles illustrated in FIG. 12A illustratively represent the aforementioned lower-limit height projection points. Then, the positions on the projection plane of each lower-limit height projection point (the horizontal position and the vertical position viewed in the coordinate system composed of the horizontal axis and the vertical axis illustrated in FIG. 12A) are calculated.

In FIG. 12A, the lower-limit height projection points corresponding to some sampling points on the horizontal trajectory of the free leg's foot 4swg are typically illustrated. Moreover, the floor surface illustrated in FIG. 12A is an example of a floor surface viewed on the projection plane.

Subsequently, as illustrated in FIG. 12A, the gait generator 22 calculates a straight line Lse (hereinafter, referred to as "beginning-to-end line Lse") between the lower-limit height projection point located at the beginning of the unit gait (the unit gait of the n-th step) on the projection plane and the lower-limit height projection point at the end of the unit gait, for convenience of arithmetic processing for determining the vertical trajectory of the free leg's foot 4swg.

Then, the gait generator 22 calculates the position on the projection plane (the horizontal position and the vertical position) of a normalized lower-limit height projection point, which is obtained by converting the vertical position of each lower-limit height projection point to a height position based on the height position of the beginning-to-end line Lse in the horizontal position of the lower-limit height projection point (in other words, a relative height to the height of the beginning-to-end line Lse).

For example, in the example illustrated in FIG. 12A, the illustrated white squares represent the normalized lower-limit height projection points. The positions on the projection plane of the normalized lower-limit height projection points are calculated.

The vertical position of the normalized lower-limit height projection point corresponding to each lower-limit height projection point is calculated by subtracting the relative height of the beginning-to-end line Lse in the horizontal position of the lower-limit height projection point (a relative height to the lower-limit height projection point at the beginning) from the vertical position of the lower-limit height projection point.

For example, in FIG. 12A, the relative height of the beginning-to-end line Lse in the horizontal position of a(k) is represented by h(k). Therefore, the vertical position of the normalized lower-limit height projection point of a(k) in the horizontal position is calculated as a position obtained by subtracting the relative height h(k) from the vertical position of the lower-limit height projection point of a(k) in the horizontal position.

The relative height of the beginning-to-end line Lse of the lower-limit height projection point in the horizontal position is a positive value if the vertical position of the free leg's foot 4swg at the end of the unit gait (=the lower-limit height at the end) is higher than the vertical position of the free leg's foot 4swg at the beginning of the unit gait (=the lower-limit height at the beginning) and a negative value if the vertical position of the free leg's foot 4swg at the end of the unit gait is lower than the vertical position of the free leg's foot 4swg at the beginning of the unit gait. Therefore, in the example illustrated in FIG. 12A, the above h(k) is a positive value.

Moreover, the horizontal position of the normalized lower-limit height projection point corresponding to each lower-limit height projection point is the same as the horizontal position of the lower-limit height projection point.

Subsequently, the gait generator 22 calculates positions on the projection plane (the horizontal position and the vertical position) of a lower-limit offset point which is a point at a height position higher than each normalized lower-limit height projection point described above by a given offset amount.

Figure 12B:
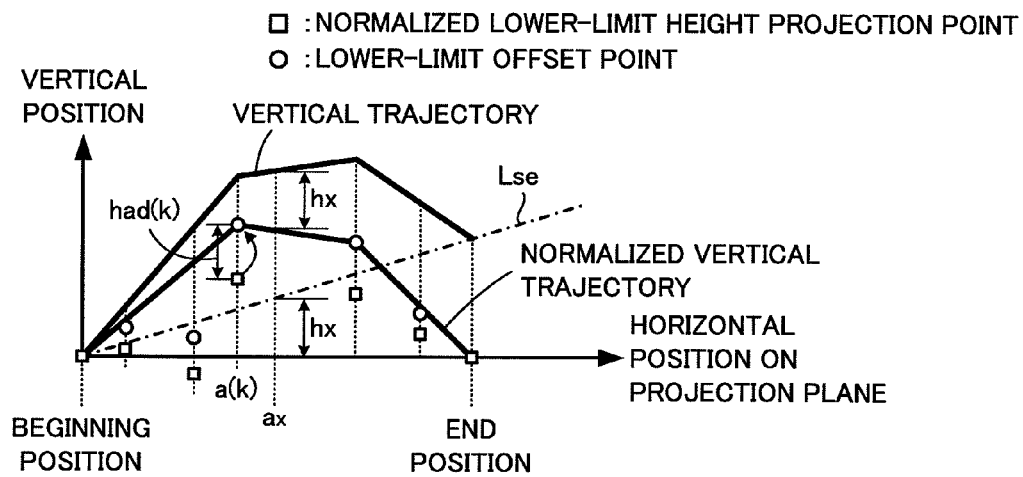

For example, in the example illustrated in FIG. 12A, white circles illustrated in FIG. 12B associated with the respective normalized lower-limit height projection points are considered to be lower-limit offset points, and the positions of the lower-limit offset points on the projection plane are calculated.

Here, the offset amount is used to give an allowance (margin) to the lower limit on the vertical position of the free leg's foot 4swg in order to reliably avoid interference between the free leg's foot 4swg and the floor surface. In this embodiment, the offset amount corresponding to each normalized lower-limit height projection point is set higher, for example, as the horizontal position of the normalized lower-limit height projection point is farther away from the position of each normalized lower-limit height projection point of the beginning and the end of the unit gait (as a shorter distance of the horizontal distance of the beginning from the normalized lower-limit height projection point and the horizontal distance of the end from the normalized lower-limit height projection point is longer). Moreover, the offset amount is set to be zero in the horizontal positions of the beginning and the end of the unit gait.

In this case, the offset amount corresponding to each normalized lower-limit height projection point is set by using a preset map or arithmetic expression, for example, from each normalized lower-limit height projection point at the beginning and at the end and a horizontal distance from each normalized lower-limit height projection point.

Moreover, the vertical position of the lower-limit offset point corresponding to each normalized lower-limit height projection point is determined by adding an offset amount (≥0) set as described above to the vertical position of the normalized lower-limit height projection point.

For example, in FIG. 12B, the offset amount set so as to correspond to the normalized lower-limit height projection point of a(k) in the horizontal position is represented by had(k). Therefore, the vertical position of the lower-limit offset point of a(k) in the horizontal position is calculated as a position obtained by adding the above offset amount had(k) to the vertical position of the normalized lower-limit height projection point of a(k) in the horizontal position.

Since the offset amount at the beginning and the end of the unit gait is zero, the lower-limit offset point at the beginning position and the lower-limit offset point at the end position coincide with the normalized lower-limit height projection points at the beginning and the end of the unit gait, respectively.

Moreover, the horizontal position of the lower-limit offset point corresponding to each normalized lower-limit height projection point is the same as the horizontal position of the normalized lower-limit height projection point.

In addition, the procedure for the processing up to determining the position of the lower-limit offset point from the lower-limit height projection point is not limited to the above procedure. For example, the position of the lower-limit offset point may be determined by correcting the vertical position with the aforementioned offset amount and thereafter correcting the vertical position with the relative height of the beginning-to-end line Lse, with respect to the lower-limit height projection point.

Alternatively, the position of the lower-limit offset point may be determined by collectively performing the correction of the vertical position with the offset amount and the correction with the relative height of the beginning-to-end line Lse, with respect to the lower-limit height projection point.

Moreover, although the height of the normalized lower-limit height projection point, which has been corrected in the vertical position (normalized in height) with the relative height of the beginning-to-end line Lse, is found with a point raised by the offset amount as a lower-limit offset point for convenience of determination processing of the vertical trajectory of the free leg's foot 4swg in this embodiment, the height of the lower-limit height projection point which has not been normalized in height may be found with a point raised by the offset amount as a lower-limit offset point.

The normalized lower-limit height projection point and the lower-limit height projection point are each uniquely defined as a point deviated in the height position by a relative height of the beginning-to-end line Lse, and therefore finding the height of the normalized lower-limit height projection point with the point raised by the offset amount as a lower-limit offset point is substantially equivalent to finding the height of the lower-limit height projection point with a point raised by the offset amount as a lower-limit offset point.

Subsequently, the gait generator 22 determines the normalized vertical trajectory, which is a convex polygonal trajectory containing a lower-limit offset point determined in the position on the projection plane as described above. This normalized vertical trajectory is determined to be formed in a convex polygonal shape so that the vertical position on the trajectory in the horizontal position of each lower-limit offset point is a height position equal to or higher than the vertical position of the lower-limit offset point. For example, in the example illustrated in FIG. 12B, the normalized vertical trajectory is determined as illustrated in the diagram.

As a method of determining the above normalized vertical trajectory, various methods may be used, and an example thereof will be described below.

In the following description, the lower-limit offset point at the beginning position of the unit gait is referred to as "beginning position lower-limit offset point Qs" and the lower-limit offset point at the end position of the unit gait is referred to as "end position lower-limit offset point Qe."

Figure 13:
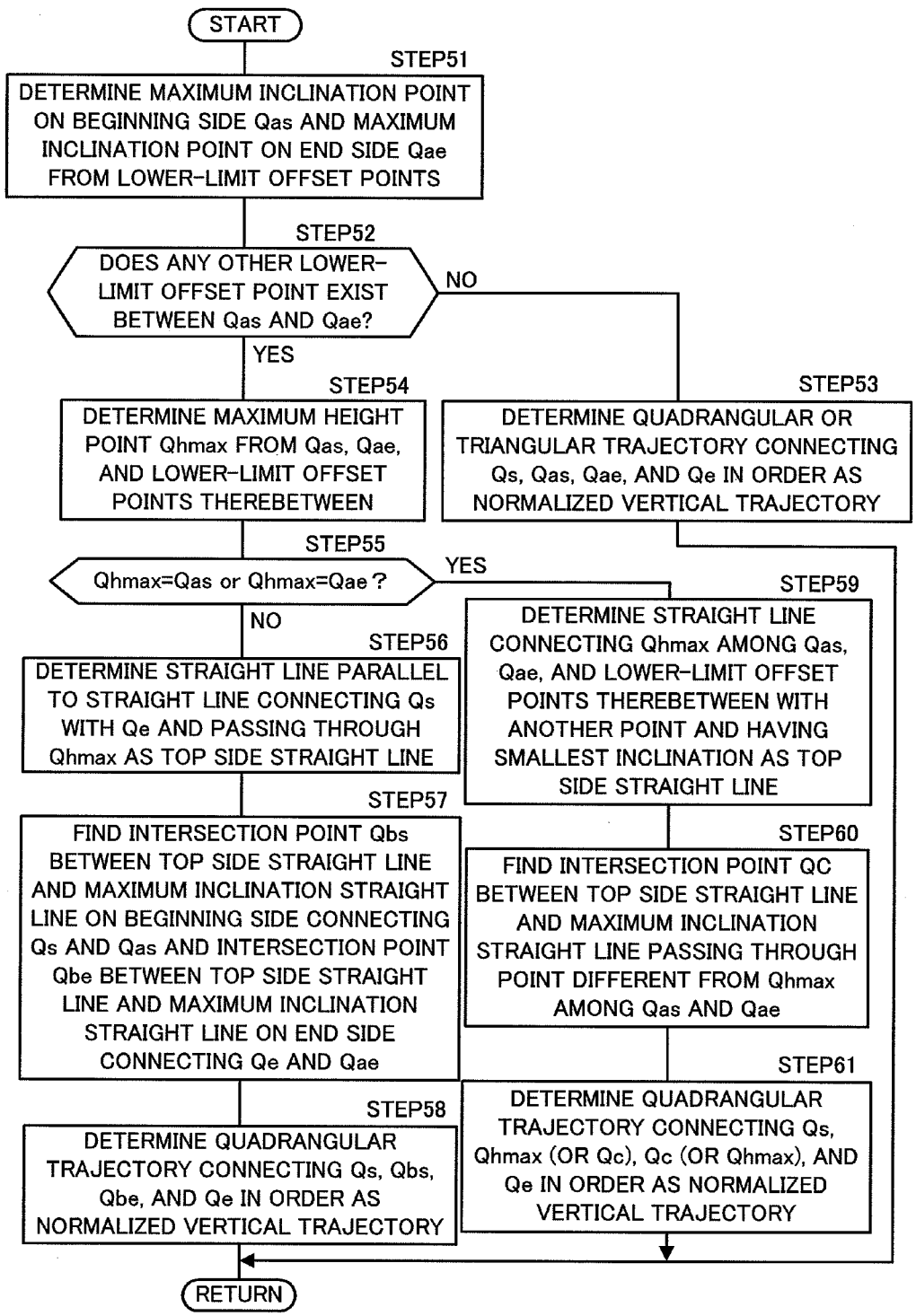
FIG. 13 is a flowchart illustrating processing for determining a normalized vertical trajectory in the process of STEP 4-6 of FIG. 9.

The normalized vertical trajectory is generated by, for example, processing illustrated by the flowchart in FIG. 13.

First, in STEP 51, the gait generator 22 determines the maximum inclination point on the beginning side Qas for use in defining the vertical trajectory on the beginning side and the maximum inclination point on the end side Qae for use in defining the vertical trajectory on the end side from the lower-limit offset points, other than the beginning position lower-limit offset point Qs and the end position lower-limit offset point Qe, among the lower-limit offset points determined as described above so as to correspond to the sampling points on the horizontal trajectory of the free leg's foot 4swg.

In the above, the maximum inclination point on the beginning side Qas is a point having the greatest tilt (an absolute value) of a straight line between the point and the beginning position lower-limit offset point Qs among lower-limit offset points other than Qs and Qe. Similarly, the maximum inclination point on the end side Qae is a point having the greatest tilt (an absolute value) of a straight line between the point and the end position lower-limit offset point Qe among lower-limit offset points other than Qs and Qe.

For example, there are assumed cases where lower-limit offset points are determined as illustrated in FIGS. 14A, 14B, and 14C. In this case, a lower-limit offset point Q1 in the example of FIG. 14A, a lower-limit offset point Q6 in the example of FIG. 14B, and a lower-limit offset point Q10 in the example of FIG. 14C are determined as the maximum inclination points on the beginning side Qas. Moreover, a lower-limit offset point Q2 in the example of FIG. 14A, a lower-limit offset point Q7 in the example of FIG. 14B, and a lower-limit offset point Q10 in the example of FIG. 14C are determined as the maximum inclination points on the end side Qae.

If there are two or more lower-limit offset points having the greatest tilt of the straight line from the beginning position lower-limit offset point Qs at the same value, the lower-limit offset point farthest from Qs among those lower-limit offset points is determined as the maximum inclination point on the beginning side Qas.

Similarly, if there are two or more lower-limit offset points having the greatest tilt of the straight line from the end position lower-limit offset point Qe at the same value, the lower-limit offset point farthest from Qe among those lower-limit offset points is determined as the maximum inclination point on the end side Qae.

In addition, the tilt of the straight line between the lower-limit offset point and the beginning position lower-limit offset point Qs and the tilt of the straight line between the lower-limit offset point and the end position lower-limit offset point Qe are, more specifically, tilts relative to a straight line between the beginning position lower-limit offset point Qs (=the normalized lower-limit height projection point at the beginning) and the end position lower-limit offset point Qe (=the normalized lower-limit height projection point at the end).

Therefore, if each lower-limit offset point is determined as a point obtained by increasing the height of the lower-limit height projection point by the offset amount, the above tilt means a tilt relative to the beginning-to-end line Lse.

Subsequently, in STEP 52, the gait generator 22 decides whether any other lower-limit offset point exists between the maximum inclination point on the beginning side Qas and the maximum inclination point on the end side Qae (more specifically, within the horizontal distance between the maximum inclination points Qas and Qae).

If the decision result is negative, the gait generator 22 determines a normalized vertical trajectory in STEP 53. In STEP 53, more specifically, the gait generator 22 determines a quadrangular or triangular convex polygonal trajectory, which is formed by connecting the beginning position lower-limit offset point Qs, the maximum inclination point on the beginning side Qas, the maximum inclination point on the end side Qae, and the end position lower-limit offset point Qe in order with segments, as a normalized vertical trajectory.

For example, in the example illustrated in FIG. 14C, the decision result of STEP 52 is negative. Furthermore, in this case, the maximum inclination point on the beginning side Qas and the maximum inclination point on the end side Qae are the same point Q10. Therefore, in STEP 53, as represented by a thick line in FIG. 14C, a triangular trajectory with Qs, Q10 (=Qas=Qae), and Qe as apexes is determined as a normalized vertical trajectory.

If the maximum inclination point on the beginning side Qas is different from the maximum inclination point on the end side Qae (if the maximum inclination points Qas and Qae are points corresponding to two sampling points adjacent to each other), a quadrangular trajectory is determined as a normalized vertical trajectory. An example of the normalized vertical trajectory in this case is illustrated in FIG. 12B.

If the decision result of STEP 52 is affirmative, the gait generator 22 determines the maximum height point Qhmax, which is the maximum in height (more specifically, the relative height to the straight line between the beginning position lower-limit offset point Qs and the end position lower-limit offset point Qe) from the maximum inclination points Qas and Qae and lower-limit offset points between these maximum inclination points Qas and Qae in STEP 54.

For example, in the examples illustrated in FIGS. 14A and 14B, the decision result of STEP 52 is affirmative. In this case, in the example illustrated in FIG. 14A, a point Q3 is determined as the maximum height point Qhmax in STEP 54. Moreover, in the example illustrated in FIG. 14B, the point Q7 (=Qae) is determined as the maximum height point Qhmax in STEP 54.

Subsequently, the gait generator 22 decides whether the maximum height point Qhmax coincides with either of the maximum inclination points Qas and Qae in STEP 55.

If the decision result of the above is negative, the gait generator 22 determines a straight line which is parallel to a straight line connecting the beginning position lower-limit offset point Qs with the end position lower-limit offset point Qe and passes through the maximum height point Qhmax as a top side straight line defining the trajectory of the top side of the normalized vertical trajectory in STEP 56. The top side straight line is a straight line where all of the maximum inclination point on the beginning side Qas, the maximum inclination point on the end side Qae, and lower-limit offset points therebetween are points on or under the top side straight line.

Subsequently, in STEP 57, the gait generator 22 finds an intersection point Qbs (determines the position of Qbs) between the top side straight line and the maximum inclination straight line on the beginning side, which is a straight line connecting the beginning position lower-limit offset point Qs with the maximum inclination point on the beginning side Qas, and finds an intersection point Qbe (determines the position of Qbe) between the top side straight line and the maximum inclination straight line on the end side, which is a straight line connecting the end position lower-limit offset point Qe with the maximum inclination point on the end side Qae.

Furthermore, the gait generator 22 determines a quadrangular (trapezoidal in this embodiment) convex polygonal trajectory, which is formed by connecting the beginning position lower-limit offset point Qs, the intersection points Qbs and Qbe, and the end position lower-limit offset point Qe in order with segments, as a normalized vertical trajectory in STEP 58.

For example, in the example illustrated in FIG. 14A, the decision result of STEP 55 is negative. In this case, in STEP 56, a straight line L3 is determined as a top side straight line. Furthermore, an intersection point Q4 between the top side straight line L3 and a straight line L1 as the maximum inclination straight line on the beginning side and an intersection point Q5 between the top side straight line L3 and a straight line L2 as the maximum inclination straight line on the end side are found as the aforementioned intersection points Qbs and Qbe, respectively.

Furthermore, in STEP 58, as represented by a thick line in the diagram, a quadrangular (trapezoidal) trajectory with Qs, Q4(=Qbs), Q5(=Qbe), and Qe as apexes is determined as a normalized vertical trajectory.

Meanwhile, if the decision result of STEP 55 is affirmative, the gait generator 22 determines the top side straight line in STEP 59. In STEP 59, more specifically, the gait generator 22 determines a straight line, which connects the maximum height point Qhmax (=Qas or Qae) among the maximum inclination point on the beginning side Qas, the maximum inclination point on the end side Qae, and the lower-limit offset points therebetween with another lower-limit offset point and which has the smallest inclination, as the top side straight line. The top side straight line determined in this manner is a straight line where all of the maximum inclination point on the beginning side Qas, the maximum inclination point on the end side Qae, and the lower-limit offset points therebetween are located on or under the top side straight line.

Subsequently, in STEP 60, the gait generator 22 finds an intersection point Qc (determines the position of Qc) between the top side straight line and the maximum inclination straight line (the maximum inclination straight line on the beginning side or the maximum inclination straight line on the end side) passing through a point different from the maximum height point Qhmax among the maximum inclination point on the beginning side Qas and the maximum inclination point on the end side Qae.

Furthermore, in STEP 61, the gait generator 22 determines a quadrangular convex polygonal trajectory, which is formed by connecting the beginning position lower-limit offset point Qs, one point Qhmax or Qc on the side closer to Qs among the maximum height point Qhmax and intersection points Qc, the other point Qc or Qhmax, and the end position lower-limit offset point Qe in order with segments as a normalized vertical trajectory.

For example, in the example illustrated in FIG. 14B, the decision result of STEP 55 is affirmative. In this case, in STEP 59, a straight line L6 connecting the point Q7 as the maximum height point Qhmax (Qhmax=Qae, here) with a point Q8 in FIG. 14B is determined as a top side straight line. Furthermore, an intersection point Q9 between the top side straight line L6 and a straight line L4 as the maximum inclination straight line on the beginning side, which connects two points, the maximum inclination point on the beginning side Q6 (=Qas), which is not the maximum height point Qhmax, and the beginning position lower-limit offset point Qs, is found as the intersection point Qc in STEP 60.

Further, in this case, the intersection point Q9 is closer to the beginning position lower-limit offset point Qs than the maximum height point Q7. Therefore, in STEP 61, as represented by a thick line in the diagram, a quadrangular trajectory with Qs, Q9 (=Qc), Q7 (=Qhmax=Qae), and Qe as apexes is determined as a normalized vertical trajectory.

This completes the detailed description of an example of a method of determining the normalized vertical trajectory.

Figure 15:
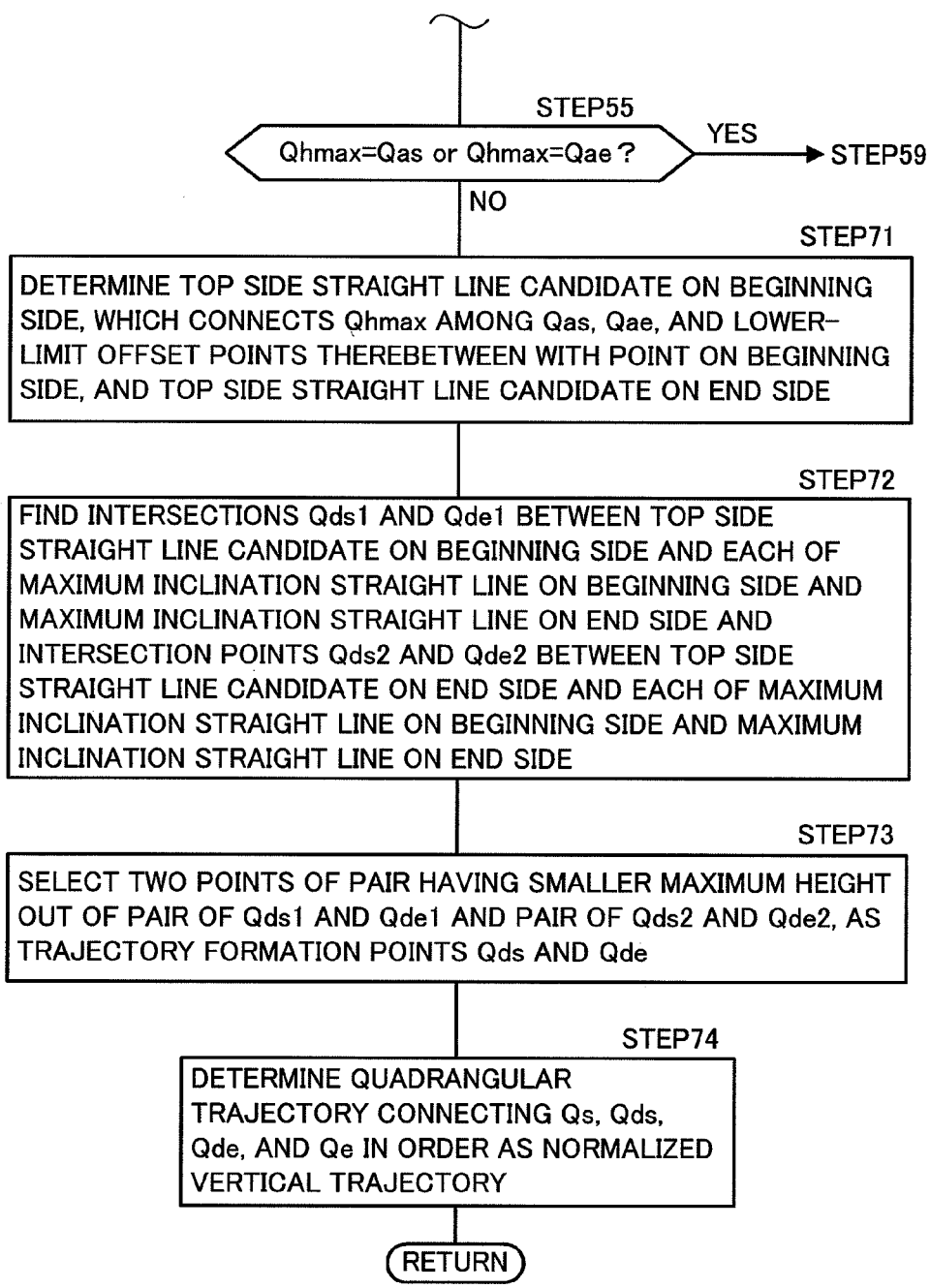
FIG. 15 is a flowchart illustrating processing of another method for determining the normalized vertical trajectory in the process of STEP 4-6 of FIG. 9.

The method of determining the convex polygonal normalized vertical trajectory containing lower-limit offset points on or inside the trajectory however is not limited to the above method. For example, if the decision result of STEP 55 is negative, the normalized vertical trajectory may be determined by a method as illustrated in the flowchart of FIG. 15. Describing hereinafter, in this example, if the decision result of STEP 55 is negative, the gait generator 22 determines a top side straight line candidate on the beginning side as a candidate for the top side straight line of the normalized vertical trajectory and the top side straight line candidate on the end side in STEP 71.

In this case, more specifically, a straight line which connects the maximum height point Qhmax among the maximum inclination point on the beginning side Qas, the maximum inclination point on the end side Qae, and lower-limit offset points therebetween with another lower-limit offset point closer to the beginning side than Qhmax and which has the smallest inclination is determined as the top side straight line candidate on the beginning side.

Moreover, a straight line which connects the maximum height point Qhmax among the maximum inclination point on the beginning side Qas, the maximum inclination point on the end side Qae, and lower-limit offset points therebetween with another lower-limit offset point closer to the end side than Qhmax and which has the smallest inclination is determined as the top side straight line candidate on the end side.

Figure 16:
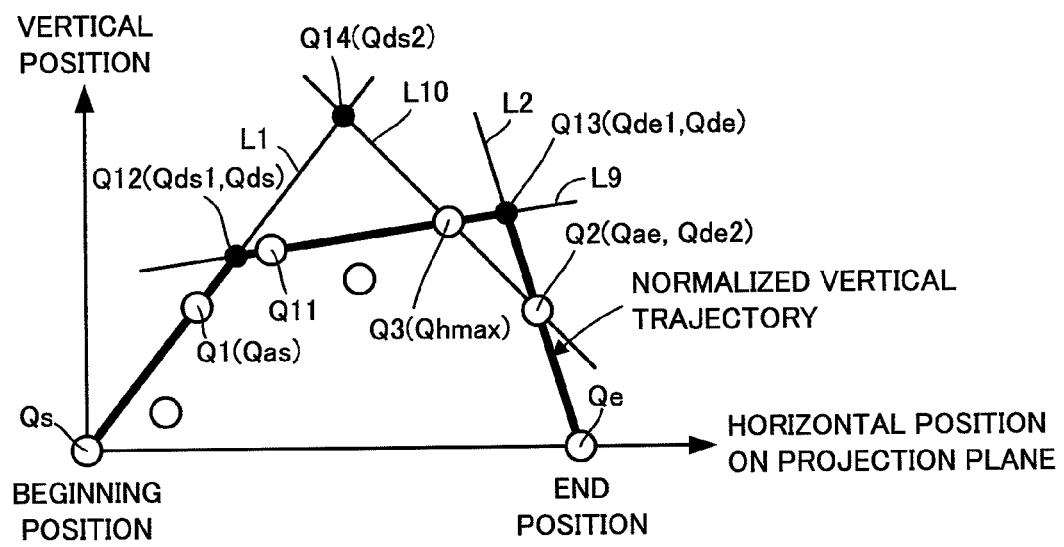
FIG. 16 is a diagram illustrating an example of the normalized vertical trajectory determined by the processing of the flowchart in FIG. 15.

For example, there is supposed an example illustrated in FIG. 16 where the arrangement of the lower-limit offset points is the same as in FIG. 14A. In this case, a straight line L9 connecting the point Q3 determined as the maximum height point Qhmax in STEP 54 with a point Q11 closer to the beginning side than the point Q3 is determined as the top side straight line candidate on the beginning side.

Moreover, a straight line L10 connecting a point Q3 with a point Q2 (Q2=Qae, here) closer to the end side than the point Q3 is determined as the top side straight line candidate on the end side.

Subsequently, in STEP 72, the gait generator 22 finds intersection points Qds1 and Qde1 between the top side straight line candidate on the beginning side determined as described above and each of the maximum inclination straight line on the beginning side and the maximum inclination straight line on the end side and further finds intersection points Qds2 and Qde2 between the top side straight line candidate on the end side and each of the maximum inclination straight line on the beginning side and the maximum inclination straight line on the end side.

For example, in the example illustrated in FIG. 16, an intersection point Q12 between a straight line L9, which is the top side straight line candidate on the beginning side, and a straight line L1, which is the maximum inclination straight line on the beginning side, and an intersection point Q13 between the straight line L9 and a straight line L2, which is the maximum inclination straight line on the end side, are found as the intersection points Qds1 and Qde1, respectively.

Furthermore, an intersection point Q14 between a straight line L10, which is the top side straight line candidate on the end side, and the straight line L1 and an intersection point Q2 between the straight line L10 and the straight line L2 are found as the intersection points Qds2 and Qde2, respectively.

Subsequently, in STEP 73, the gait generator 22 determines two points of a pair having a smaller maximum height (the maximum value of the height [more specifically, a relative height to a straight line connecting the beginning position lower-limit offset point Qs with the end position lower-limit offset point Qe] of a point for each pair), out of the pair of the intersection points Qds1 and Qde1 corresponding to the top side straight line candidate on the beginning side and the pair of the intersection points Qds2 and Qde2 corresponding to the top side straight line candidate on the end side, as trajectory formation points Qds and Qde as the points forming the normalized vertical trajectory (break points on the normalized vertical trajectory).

For example, in the example illustrated in FIG. 16, the maximum height of the pair of intersection points Qds1 and Qde1 corresponding to the top side straight line candidate on the beginning side is the height of Q13 (=Qde1), and the maximum height of the intersection points Qds2 and Qde2 corresponding to the top side straight line candidate on the end side is the height of Q14 (=Qds2). The maximum height of the former is smaller than the maximum height of the latter.

Therefore, in this case, the intersection points Q12 (=Qds1) and Q13 (=Qde1) are determined as trajectory formation points Qds and Qde.

Thereafter, in STEP 74, the gait generator 22 determines a quadrangular convex polygonal trajectory formed by connecting the beginning position lower-limit offset point Qs, the trajectory formation points Qds and Qde, and the end position lower-limit offset point Qe in order with segments as a normalized vertical trajectory.

For example, in the example illustrated in FIG. 16, the intersection points Q12 (=Qds 1) and Q13 (=Qde1) are determined as trajectory formation points Qds and Qde, and therefore as represented by a thick line in the diagram, a quadrangular (trapezoidal) trajectory with the points Qs, Q12, Q13, and Qe as apexes is determined as a normalized vertical trajectory.

Thus, in the example described with reference to FIGS. 15 and 16, the top side of the normalized vertical trajectory determined if the decision result of STEP 55 is negative is generally a segment inclined with respect to a straight line between the points Qs and Qe.

In this embodiment, the gait generator 22 determines the normalized vertical trajectory as described hereinabove and then determines a vertical trajectory of the free leg's foot 4swg by using the normalized vertical trajectory.

In this case, the vertical trajectory of the free leg's foot 4swg is determined as a trajectory where the height position of the free leg's foot 4swg (more specifically, the vertical [Z-axis direction] position viewed in the robot coordinate system corresponding to the supporting leg's foot 4sup in the n-th step) in each horizontal position on the projection plane (an arbitrary horizontal position between the beginning position and the end position) is a height position obtained by adding a relative height of the beginning-to-end line Lse in the horizontal position (a relative height to the height in the beginning position) to the height position of the normalized vertical trajectory in the horizontal position.

For example, in the examples illustrated in FIGS. 12A and 12B, the height position (the vertical position) of the vertical trajectory in the horizontal position of ax in FIG. 12B is a height position obtained by adding a relative height hx of the beginning-to-end line Lse in the position ax to the height position of the normalized vertical trajectory in the position ax.

Returning to the description of the flowchart of FIG. 9, after determining the vertical trajectory of the free leg's foot 4swg in STEP 4-6 as described hereinabove, the gait generator 22 subsequently performs the process of STEP 4-7 and then determines a foot position trajectory parameter which defines the horizontal trajectory and the vertical trajectory of the free leg's foot 4swg.

In this case, as a foot position trajectory parameter which defines the horizontal trajectory, for example, a parameter is determined which specifies a function approximating a pair of horizontal positions in a plurality of points on the horizontal trajectory and time (time where the time at the beginning is used as a reference) or the shape of the horizontal trajectory.

Moreover, as a foot position trajectory parameter which defines the vertical trajectory, for example, there is determined a pair of vertical positions of the respective break points on the vertical trajectory (Z-axis direction positions) including the beginning point and the end point in the unit gait and time (time where the time at the beginning is used as a reference).

This completes the detailed description of the processing for determining the foot position/posture trajectory parameter which defines the foot position/posture trajectory of each foot 4 by the gait generator 22 in this embodiment.

The correspondence relation between the embodiments described hereinabove and the present invention is additionally described here.

In this embodiment, the control processing unit 11 has a function of a leg motion trajectory generation device of the present invention. Further, the floor surface information acquisition portion 21 of the control processing unit 11 implements a floor surface information acquisition element of the present invention.

Moreover, the gait generator 22 of the control processing unit 11 includes the functions of a desired landing position/posture setting element, a horizontal trajectory determination element, a lower-limit height determination element, a vertical trajectory determination element, a lower-limit offset point determination element in the present invention.

In this case, more specifically, the process of STEP 3 implements a desired landing position/posture setting element and the process of STEP 4-1 implements a horizontal trajectory determination element. In addition, the horizontal trajectory of the free leg's foot 4swg determined by the process of STEP 4-1 corresponds to a desired horizontal motion trajectory of the distal end of a free leg in the present invention.

Moreover, the processes of STEPS 4-3 to 4-5 implement a lower-limit height determination element, and the process of STEP 4-6 implements a vertical trajectory determination element. In this case, the process of determining the lower-limit offset point in the process of STEP 4-6 implements the lower-limit offset point determination element in the present invention.

In addition, the vertical trajectory of the free leg's foot 4swg determined in the process of STEP 4-6 corresponds to a desired vertical motion trajectory of the distal end of a free leg in the present invention.

According to the embodiments described hereinabove, the floor surface information for each local region AR acquired by the floor surface information acquisition portion 21 is used to determine the desired landing position and the desired landing posture of the free leg's foot 4swg within the single free leg's foot 4swg so as to satisfy the ground contact state condition, the height/inclination condition, the combination condition, and the trajectory condition. Therefore, even if the floor surface on which the robot 1 is moved has a configuration with various heights and inclinations, it is possible to control the displacement amount of each joint of the robot 1 to be within the movable range of and to secure the ground contact state after landing of the free leg's foot 4swg stably. Moreover, it is possible to determine the desired landing position and the desired landing posture of the free leg's foot 4swg in such a way as to prevent the existence of a local region AR having a floor surface of an excessive height on the way of the trajectory of the free leg's foot 4swg or a local region AR with unknown floor surface information.

Further, the lower-limit height in the horizontal position is determined for each sampling point on the horizontal trajectory of the free leg's foot 4swg in the unit gait, and the vertical trajectory of the free leg's foot 4swg is determined so as to obtain a convex-shaped trajectory containing a lower-limit offset point, which is a point in the height position obtained by adding an offset amount to the determined lower-limit height.

Therefore, it is possible to determine a vertical trajectory reliably enabling the prevention of a contact between the free leg's foot 4swg and the floor surface, independently of the floor surface configuration on the way of the trajectory.

Therefore, according to the embodiment, it is possible to generate a desired foot position/posture trajectory so that the robot 1 is able to move on a floor surface having various configurations.

In addition, in this embodiment, a desired foot position/posture trajectory in the unit gaits up to the N-th step is determined, and then the desired foot position/posture trajectory is used to determine the virtual periodic gait (steady-state gait) subsequent to the current time gait as disclosed in Japanese Patent No. 3726081 or Japanese Patent No. 3674789. Moreover, the desired ZMP trajectory is corrected from the standard trajectory with the periodic gait as a future convergence target, and the desired body position/posture trajectory in the current time gait is determined by using a dynamic model so as to satisfy the desired ZMP trajectory (so that a component about the horizontal axis of a moment generated about the desired ZMP becomes zero, where the moment is generated by a resultant force of the inertial force generated by the motion of the robot 1 and the gravitational force acting on the robot 1).

In this case, depending on the desired foot position/posture trajectory in a periodic gait, the desired ZMP trajectory may deviate from an acceptable region within a supporting polygon when the desired ZMP trajectory is corrected with the periodic gait as a future convergence target.

In such a case, the basic required landing position/posture in STEP 1 is corrected and then the processing from STEP 2 is performed again. Thereafter, the desired foot position/posture trajectory of each foot 4 in the unit gaits up to the n-th step may be determined.

In the embodiment described hereinabove, the normalized lower-limit height projection point is determined from the lower-limit height projection point and thereafter the vertical trajectory of the free leg's foot 4*swg* is determined. The vertical trajectory of the free leg's foot 4*swg*, however, may be determined without performing the processing of determining the normalized lower-limit height projection point. In that case, a point obtained by increasing the height of the lower-limit height projection point by the offset amount is determined as a lower-limit offset point, and thereafter a trajectory determined by the same processing as the above processing of determining the normalized vertical trajectory may be directly determined as a vertical trajectory of the free leg's foot 4*swg*.

In this case, the beginning position lower-limit offset point Qs and the end position lower-limit offset point Qe coincide with the lower-limit height projection point at the beginning of the unit gait (=a point in the position of the free leg's foot 4*swg* at the beginning) and the lower-limit height projection point at the end of the unit gait (=a point in the position of the free leg's foot 4*swg* at the end), respectively. The straight line connecting these points Qs and Qe coincides with the beginning-to-end line Lse.

Although the vertical trajectory of the leg's foot 4*swg* is assumed to be a triangular or quadrangular trajectory in this embodiment, the vertical trajectory may be a convex polygonal trajectory having more corners such as a pentagon or the like. For example, in the example illustrated in FIG. 16, a pentagonal trajectory connecting the points Qs, Q12, Q3, Q2, and Qe in order is determined as a normalized vertical trajectory, and a trajectory formed by correcting the height of the normalized vertical trajectory by the relative height of the beginning-to-end line Lse may be determined as a vertical trajectory of the free leg's foot 4*swg*.

Furthermore, for example, the vertical trajectory between the maximum inclination point on the beginning side and the maximum inclination point on the end side may be determined to be a convex-curved trajectory.

While the present invention has been described by giving an example of a biped locomotion robot having two legs 3 and 3 in this embodiment, the legged mobile robot according to the present invention may be a robot having three or more legs.

Moreover, the distal end of each leg 3 is not limited to a foot-shaped distal end, but may be formed in any other shape.

What is claimed is:

1. A leg motion trajectory generation device for a legged mobile robot which generates a desired motion trajectory of each leg in the legged mobile robot which moves by repeating a leaving motion and a landing motion of a distal end of each of a plurality of the legs, the generation device comprising:

a floor surface information acquisition element which acquires floor surface information including at least floor surface information which is identified beforehand in each of a plurality of local regions of a floor surface in an operating environment of the robot and which represents a position and a posture of a ground-contactable surface of the distal end of each leg of the robot in each local region;

a desired landing position/posture setting element which sets a desired landing position and a desired landing posture of the distal end of a free leg, which is a leg making the leaving motion and the landing motion subsequent thereto in the moving motion of the robot, within one local region among the plurality of local regions in which the floor surface information is acquired;

a horizontal trajectory determination element which determines a desired horizontal motion trajectory of the distal end of the free leg from a ground contact position immediately before starting the leaving motion of the distal end of the free leg to the set desired landing position, so as to prevent a contact at least between the free leg and another leg;

a lower-limit height determination element which sets a plurality of sampling points on the determined desired horizontal motion trajectory and determines the lower-limit height of the distal end of the free leg, which is necessary to prevent a contact between the distal end of the free leg at the position of the sampling point and the floor surface of a local region existing at the position of the sampling point among the plurality of local regions in which the floor surface information is acquired, on the basis of the floor surface information of the local region existing at the position of the sampling point for each sampling point; and a vertical trajectory determination element which determines a desired vertical motion trajectory of the distal end of the free leg so that the height of the distal end of the free leg at the positions of the plurality of sampling points is equal to or greater than the determined lower-limit height.

2. The leg motion trajectory generation device for the legged mobile robot according to claim 1,
wherein the local region has an area capable of including the distal end of an arbitrary single leg among the plurality of legs of the robot inside the local region.

3. The leg motion trajectory generation device for the legged mobile robot according to claim 1,
wherein the desired landing position/posture setting element sets the desired landing position and the desired landing posture so that, in the case where the ground-contactable surface of the local region where the desired landing position and the desired landing posture are set is a ground-contactable surface having an edge which is a boundary line of the ground-contactable surface within the local region, the area of a contact surface between the ground-contactable surface and the distal end of the leg and the posture of the distal end of the leg with respect to the direction of the edge satisfy at least a ground contact state condition determined in advance.

4. The leg motion trajectory generation device for the legged mobile robot according to claim 3,
wherein the desired landing position/posture setting element sets the desired landing position and the desired landing posture so that the combination between the horizontal position among the desired landing positions of the distal end of the free leg and the posture in the direction about the vertical axis among the desired landing postures of the free leg satisfies a given combination condition determined in advance.

5. The leg motion trajectory generation device for the legged mobile robot according to claim 1,
wherein the horizontal trajectory determination element determines the desired horizontal motion trajectory so that the maximum height of the supporting leg among the legs of the robot relative to the ground contact surface of the floor surface in the local region, which exists in the position on the desired horizontal motion trajectory of the distal end of the free leg among the plurality of local regions in which the floor surface information is acquired, is equal to or lower than a given value determined in advance.

6. The leg motion trajectory generation device for the legged mobile robot according to claim 1,
wherein the lower-limit height determination element uses a virtual free leg distal end, which is a virtual distal end determined in advance so as to have a larger size than the actual distal end of the free leg to find the maximum height of the virtual free leg distal end at which a contact occurs between the virtual free leg distal end and the floor surface of the local region which exists at the position of each sampling point and determines the height of the distal end of the free leg defined according to the found maximum height as the lower-limit height at the sampling point.

7. The leg motion trajectory generation device for the legged mobile robot according to claim 1,
wherein the vertical trajectory determination element includes a lower-limit offset point determination element which determines a lower-limit offset point, which is a point having a horizontal position which is the same as the sampling point for each sampling point set on the desired horizontal motion trajectory between the ground contact position immediately before starting the leaving motion of the distal end of the free leg and the desired landing position and having a height position higher than the lower-limit height determined so as to correspond to the sampling point by a given offset amount, and the vertical trajectory determination element determines the desired vertical motion trajectory of the distal end of the free leg from the ground contact position immediately before starting the leaving motion of the distal end of the free leg to the desired landing position so as to pass through a lower-limit offset point having the greatest relative height to a virtual straight-line trajectory from the ground contact position immediately before starting the leaving motion of the distal end of the free leg to the desired landing position among the lower-limit offset points and so as to be a convex-shaped trajectory including each lower-limit offset point inside thereof.

8. The leg motion trajectory generation device for the legged mobile robot according to claim 7,
wherein the vertical trajectory determination element determines the desired vertical motion trajectory so that a trajectory near the ground contact position immediately before starting the leaving motion of the distal end of the free leg in the desired vertical motion trajectory is a straight-line trajectory having the greatest tilt relative to the virtual straight-line trajectory among straight lines from the ground contact position to each lower-limit offset point and so that a trajectory near the desired landing position of the distal end of the free leg in the desired vertical motion trajectory is a straight-line trajectory having the greatest tilt relative to the virtual straight-line trajectory among straight lines from the desired landing position to each lower-limit offset point.

9. The leg motion trajectory generation device for the legged mobile robot according to claim 8,
wherein the vertical trajectory determination element determines the desired vertical motion trajectory so that the maximum height of the relative height of the desired vertical motion trajectory to the virtual straight-line trajectory is equal to or lower than the relative height of the lower-limit offset point having the greatest relative height to the virtual straight-line trajectory among the lower-limit offset points.

* * * * *